United States Patent
Sakai et al.

(10) Patent No.: US 9,660,863 B2
(45) Date of Patent: May 23, 2017

(54) NETWORK CONNECTING METHOD AND ELECTRONIC DEVICE

(71) Applicants: FUJITSU FSAS INC., Tokyo (JP); FUJITSU LIMITED, Kawasaki (JP)

(72) Inventors: Kouji Sakai, Sinagawa (JP); Seigo Kotani, Kobe (JP)

(73) Assignees: FUJITSU FSAS INC., Tokyo (JP); FUJITSU LIMITED, Kawasaki (JP)

( * ) Notice: Subject to any disclaimer, the term of this patent is extended or adjusted under 35 U.S.C. 154(b) by 194 days.

(21) Appl. No.: 13/961,426

(22) Filed: Aug. 7, 2013

(65) Prior Publication Data

US 2014/0068028 A1 Mar. 6, 2014

(30) Foreign Application Priority Data

Aug. 31, 2012 (JP) ................... 2012-192643

(51) Int. Cl.
*H04L 12/24* (2006.01)
*G06F 21/44* (2013.01)
*H04L 29/06* (2006.01)

(52) U.S. Cl.
CPC .......... *H04L 41/0803* (2013.01); *G06F 21/44* (2013.01); *H04L 63/0853* (2013.01); *H04L 63/0876* (2013.01); *H04L 63/105* (2013.01)

(58) Field of Classification Search
CPC ............... H04L 29/06; H04L 29/08072; H04L 29/08981

(Continued)

(56) References Cited

U.S. PATENT DOCUMENTS

2004/0243801 A1* 12/2004 Chen ................. G06F 21/34
   713/160
2006/0085844 A1* 4/2006 Buer .................... H04L 63/068
   726/4

(Continued)

FOREIGN PATENT DOCUMENTS

JP 2001-345795 12/2001
JP 2003-30155 1/2003

(Continued)

OTHER PUBLICATIONS

Extended European Search Report, dated Nov. 22, 2013, in corresponding European Application No. 13180056.7 (4 pp.).

(Continued)

*Primary Examiner* — Nicholas Taylor
*Assistant Examiner* — Chong G Kim
(74) *Attorney, Agent, or Firm* — Staas & Halsey LLP

(57) ABSTRACT

A first electronic device transmits first configuration information of the first electronic device collected by a tamper-resistant chip mounted thereon and approved by a third-party device to a second electronic device over a short-distance network. The second electronic device transmits second configuration information of the second electronic device collected by a tamper-resistant chip mounted thereon and approved by the third-party device to the first electronic device over the short-distance network. The first electronic device transmits the first configuration information and the second configuration information to the second electronic device over a network. The second electronic device controls connection between the first electronic device and the second electronic device over the network based on the first configuration information and the second configuration information received from the first electronic device.

5 Claims, 22 Drawing Sheets

(58) Field of Classification Search
USPC .......................................................... 709/220
See application file for complete search history.

(56) References Cited

U.S. PATENT DOCUMENTS

| | | | |
|---|---|---|---|
| 2007/0147318 A1* | 6/2007 | Ross | H04L 63/104 370/338 |
| 2007/0165264 A1* | 7/2007 | Minami | G03G 15/5079 358/1.14 |
| 2007/0294416 A1* | 12/2007 | Agre | H04L 63/0263 709/229 |
| 2008/0046898 A1* | 2/2008 | Molina | G06F 21/72 719/330 |
| 2008/0104683 A1* | 5/2008 | Nagami | H04L 29/12207 726/5 |
| 2009/0011739 A1* | 1/2009 | Cofta | G06F 21/445 455/411 |
| 2009/0041252 A1* | 2/2009 | Hanna | H04L 63/12 380/278 |
| 2009/0307492 A1* | 12/2009 | Cao et al. | 713/169 |
| 2010/0023755 A1* | 1/2010 | Kotani | G06F 21/33 713/156 |
| 2011/0010543 A1* | 1/2011 | Schmidt | H04W 12/10 713/168 |
| 2011/0107079 A1* | 5/2011 | Minami et al. | 713/150 |
| 2011/0202992 A1* | 8/2011 | Xiao | G06F 21/33 726/10 |
| 2011/0237234 A1 | 9/2011 | Kotani et al. | |
| 2013/0290565 A1* | 10/2013 | Kamakura | G06F 21/70 709/245 |
| 2014/0068046 A1* | 3/2014 | Sakai | H04L 63/0884 709/223 |

FOREIGN PATENT DOCUMENTS

| | | |
|---|---|---|
| JP | 2006-197063 | 7/2006 |
| JP | 2007-306369 | 11/2007 |
| JP | 2009-134731 | 6/2009 |
| JP | 2011-30608 | 2/2011 |
| WO | WO 02/17048 | 2/2002 |
| WO | WO 2007/104923 | 9/2007 |

OTHER PUBLICATIONS

Japanese Office Action dated Mar. 8, 2016 in corresponding Japanese Patent Application No. 2012-192643.

* cited by examiner

FIG.11

| ENTRY NUMBER | ENTRY |
|---|---|
| 1 | CONFIGURATION INFORMATION REPRESENTING BOOT BLOCK PORTION OF MOBILE TERMINAL (HASH) |
| 2 | CONFIGURATION INFORMATION REPRESENTING BIOS PORTION OF MOBILE TERMINAL (HASH) |
| 3 | CONFIGURATION INFORMATION REPRESENTING DEVICE CONFIGURATION PORTION OF MOBILE TERMINAL (HASH) |
| ... | ... |

| YEAR, MONTH, AND DATE OF CREATION | TIME OF CREATION | DESIGNATION CONFIGURATION INFORMATION |
|---|---|---|
| YY/MM/DD | HH:MM:SS | CONFIGURATION INFORMATION 210a OF WIRELESS LAN ROUTER 200a (HASH) |
| ... | ... | ... |

| YEAR, MONTH, AND DATE OF CREATION | TIME OF CREATION | POLICY | PERMISSIBILITY |
|---|---|---|---|
| YY/MM/DD | HH:MM:SS | REFER TO LOG ON WIRELESS LAN ROUTER 200 | PERMITTED |
| YY/MM/DD | HH:MM:SS | MODIFY LOG ON WIRELESS LAN ROUTER 200 | REJECTED |

| DEGREE OF MATCH | NETWORK CONNECTION LEVEL |
|---|---|
| 30 | REFER TO LOG ON WIRELESS LAN ROUTER |
| 40 | REFER TO SETTING VALUE IN WIRELESS LAN ROUTER (LOW SECURITY) |
| 50 | REFER TO SETTING VALUE IN WIRELESS LAN ROUTER (HIGH SECURITY) |
| 60 | MODIFY SETTING IN WIRELESS LAN ROUTER (LOW SECURITY) |
| 70 | MODIFY SETTING IN WIRELESS LAN ROUTER (HIGH SECURITY) |
| 30 | REFER TO LOG ON PERSONAL COMPUTER |
| 40 | REFER TO SETTING VALUE IN PERSONAL COMPUTER (LOW SECURITY) |
| 50 | REFER TO SETTING VALUE IN PERSONAL COMPUTER (HIGH SECURITY) |
| 60 | MODIFY SETTING IN PERSONAL COMPUTER (LOW SECURITY) |
| 70 | MODIFY SETTING IN PERSONAL COMPUTER (HIGH SECURITY) |
| 30 | REFER TO FILE ON PERSONAL COMPUTER |
| 40 | ADD FILE TO PERSONAL COMPUTER |
| 50 | MODIFY FILE ON PERSONAL COMPUTER |
| 60 | DELETE FILE ON PERSONAL COMPUTER |
| 70 | SHARE FILE ON PERSONAL COMPUTER |
| 80 | FORWARD FILE ON PERSONAL COMPUTER TO EXTERNAL |

FIG.15

| YEAR, MONTH, AND DATE OF EVENT | TIME OF EVENT | OPERATED DEVICE | OPERATOR | DESCRIPTION OF OPERATION | NAME OF VENDOR |
|---|---|---|---|---|---|
| YY/MM/DD | HH:MM:SS | MOBILE TERMINAL | MR. A | CREATED CONFIGURATION INFORMATION REPORT | MOBILE VENDOR A |
| YY/MM/DD | HH:MM:SS | MOBILE TERMINAL | MR. A | SENT CONFIGURATION INFORMATION REPORT | MOBILE VENDOR A |

FIG.16

| YEAR, MONTH, AND DATE OF CREATION | TIME OF CREATION | DEVICE CREATED | SIGNATURE INFORMATION | CONFIGURATION INFORMATION 1 | CONFIGURATION INFORMATION 2 | ... | CONFIGURATION INFORMATION N |
|---|---|---|---|---|---|---|---|
| YY/MM/DD | HH:MM:SS | MOBILE TERMINAL 100 | DIGITAL SIGNATURE A | CONFIGURATION INFORMATION REPRESENTING BOOT BLOCK PORTION (HASH) | CONFIGURATION INFORMATION REPRESENTING DEVICE CONFIGURATION PORTION (HASH) | ... | ... |

| ENTRY NUMBER | ENTRY |
|---|---|
| 1 | CONFIGURATION INFORMATION REPRESENTING BOOT BLOCK PORTION OF WIRELESS LAN ROUTER (HASH) |
| 2 | CONFIGURATION INFORMATION REPRESENTING BIOS PORTION OF WIRELESS LAN ROUTER (HASH) |
| 3 | CONFIGURATION INFORMATION REPRESENTING DEVICE CONFIGURATION PORTION OF WIRELESS LAN ROUTER (HASH) |
| ... | ... |

| YEAR, MONTH, AND DATE OF CREATION | TIME OF CREATION | DESIGNATION CONFIGURATION INFORMATION |
|---|---|---|
| YY/MM/DD | HH:MM:SS | CONFIGURATION INFORMATION 110a OF WIRELESS MOBILE TERMINAL (HASH) |
| ... | ... | ... |

| YEAR, MONTH, AND DATE OF CREATION | TIME OF CREATION | POLICY | PERMISSIBILITY |
|---|---|---|---|
| YY/MM/DD | HH:MM:SS | REFER TO LOG ON WIRELESS LAN ROUTER 200 | PERMITTED |
| YY/MM/DD | HH:MM:SS | MODIFY LOG ON WIRELESS LAN ROUTER 200 | REJECTED |

| YEAR, MONTH, AND DATE OF EVENT | TIME OF EVENT | OPERATED DEVICE | OPERATOR | DESCRIPTION OF OPERATION | NAME OF VENDOR |
|---|---|---|---|---|---|
| YY/MM/DD | HH:MM:SS | WIRELESS LAN ROUTER | MR. A | CREATED CONFIGURATION INFORMATION REPORT | ROUTER VENDOR A |
| YY/MM/DD | HH:MM:SS | WIRELESS LAN ROUTER | MR. A | SENT CONFIGURATION INFORMATION REPORT | ROUTER VENDOR A |

FIG.22

| YEAR, MONTH, AND DATE OF CREATION | TIME OF CREATION | DEVICE CREATED | SIGNATURE INFORMATION | CONFIGURATION INFORMATION 1 | CONFIGURATION INFORMATION 2 | ... |
|---|---|---|---|---|---|---|
| YY/MM/DD | HH:MM:SS | WIRELESS LAN ROUTER | DIGITAL SIGNATURE B | CONFIGURATION INFORMATION REPRESENTING BOOT BLOCK PORTION (HASH) | CONFIGURATION INFORMATION REPRESENTING DEVICE CONFIGURATION PORTION (HASH) | ... |

| CONFIGURAION ITEM | | VALUE |
|---|---|---|
| BOOT BLOCK | BOOT BLOCK a (HASH) | 10 |
| | BOOT BLOCK b (HASH) | 3 |
| | BOOT BLOCK c (HASH) | 1 |
| | N/A | 0 |
| BIOS | BIOS-a (HASH) | 10 |
| | BIOS-b (HASH) | 3 |
| | BIOS-c (HASH) | 1 |
| | N/A | 0 |
| MBR | MBR-a (HASH) | 10 |
| | MBR-b (HASH) | 3 |
| | MBR-c (HASH) | 1 |
| | N/A | 0 |
| OS BOOT SECTOR | OS BOOT SECTOR a (HASH) | 10 |
| | OS BOOT SECTOR b (HASH) | 3 |
| | OS BOOT SECTOR c (HASH) | 1 |
| | N/A | 0 |
| OS BOOT BLOCK | OSBOOT BLOCK a (HASH) | 10 |
| | OSBOOT BLOCK b (HASH) | 3 |
| | OSBOOT BLOCK c (HASH) | 1 |
| | N/A | 0 |
| OS BOOT MANAGER | OS BOOT MANAGER a (HASH) | 10 |
| | OS BOOT MANAGER b (HASH) | 3 |
| | OS BOOT MANAGER c (HASH) | 1 |
| | N/A | 0 |
| OS LOADER | OS LOADER a (HASH) | 10 |
| | OS LOADER b (HASH) | 3 |
| | OS LOADER c (HASH) | 1 |
| | N/A | 0 |
| PHYSICAL TCG CHIP | PHYSICAL TPM CHIP a (HASH) | 10 |
| | PHYSICAL TPM CHIP b (HASH) | 3 |
| | PHYSICAL TPM CHIP c (HASH) | 1 |
| | NONE | 0 |
| PHYSICAL TCG VERSION | PHYSICAL TPM VERSION a (HASH) | 10 |
| | PHYSICAL TPM VERSION b (HASH) | 3 |
| | PHYSICAL TPM VERSION c (HASH) | 1 |

FIG.25

| YEAR, MONTH, AND DATE OF EVENT | TIME OF EVENT | OPERATED DEVICE | OPERATOR | DESCRIPTION OF OPERATION | NAME OF VENDOR |
|---|---|---|---|---|---|
| YY/MM/DD | HH:MM:SS | ISP | MR. C | ADDED INFORMATION TO BOOT BLOCK PORTION OF LEVELING POLICY | MOBILE VENDOR A |
| YY/MM/DD | HH:MM:SS | ISP | MR. C | ADDED INFORMATION TO BIOS PORTION OF LEVELING POLICY | MOBILE VENDOR A |

310b

NETWORK CONNECTING METHOD AND ELECTRONIC DEVICE

CROSS-REFERENCE TO RELATED APPLICATION

This application is based upon and claims the benefit of priority of the prior Japanese Patent Application No. 2012-192643, filed on Aug. 31, 2012, the entire contents of which are incorporated herein by reference.

FIELD

The embodiments discussed herein are related to a network connecting method and the like.

BACKGROUND

For data communication between devices over a wireless local area network (LAN), some security standards have been recently developed by the Institute of Electrical and Electronic Engineers (IEEE), for example, and data communication can be performed relatively safely by following these standards.

For example, in a case of a wireless LAN, because devices communicate with each other in a relatively small area where the radio waves can be received, and a user of each of the devices can check the other devices belonging to other communicating users, available is a technology in which a shared private key is distributed to and used among the devices belonging to communicating users who can be identified by one another, to achieve highly confidential wireless communication. Examples of related art include those disclosed in Japanese Laid-open Patent Publication No. 2001-345795, Japanese Laid-open Patent Publication No. 2006-197063, Japanese Laid-open Patent Publication No. 2009-134731, Japanese Laid-open Patent Publication No. 2011-030608, and Japanese Laid-open Patent Publication No. 2003-030155.

In establishing connection between devices over a network, such a conventional technology can fail to establish connection to appropriate designation devices.

The devices establish a secure connection between all devices connected not only to a wireless LAN but also to a network such as the Internet, after determining if a designation device is a legitimate designation. In making such a determination as to whether the designation device is a legitimate designation, information such as a unique number of the device, a media access control (MAC) address, an Internet Protocol (IP) address, a Wired Equivalent Privacy (WEP) key, or a serial number of the device is used. However, because these types of information are information that can be falsified by a third party, the conventional technology is incapable of validating the legitimacy of a designation appropriately.

SUMMARY

According to an aspect of an embodiment, a network connecting method includes first transmitting at which a first electronic device transmits first configuration information of the first electronic device collected by a tamper-resistant chip mounted on the first electronic device and approved by a third-party device to a second electronic device over a short-distance network; second transmitting at which the second electronic device transmits second configuration information of the second electronic device collected by a tamper-resistant chip mounted on the second electronic device and approved by the third-party device to the first electronic device over the short-distance network; third transmitting at which the first electronic device transmits the first configuration information of the first electronic device and the second configuration information of the second electronic device to the second electronic device over a network; and controlling at which the second electronic device controls connection between the first electronic device and the second electronic device over the network based on the first configuration information and the second configuration information received from the first electronic device.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

As described previously, introducing the retransmission control increases chances of successful radio signal transmission. However, it causes consumption of radio resources.

FIG. 11 is a schematic of an example of a data structure of configuration information stored in a TPM chip on the mobile terminal;

FIG. 12 is a schematic of an example of a data structure of a connection permission list 110b in the mobile terminal;

FIG. 13 is a schematic of an example of a data structure of the corresponding policy for the mobile terminal;

FIG. 14 is a schematic of an example of a data structure of a determination table for the mobile terminal;

FIG. 15 is a schematic of an example of a data structure of an operation log of the mobile terminal;

FIG. 16 is a schematic of an example of a data structure of a configuration information report 100A;

FIG. 18 is a schematic of an example of a data structure of configuration information stored in a TPM chip on the wireless LAN router;

FIG. 19 is a schematic of an example of a data structure of a connection permission list 210b for the wireless LAN router;

FIG. 20 is a schematic of an example of a data structure of a corresponding policy for the wireless LAN router;

FIG. 21 is a schematic of an example of a data structure of an operation log of the wireless LAN router;

FIG. 22 is a schematic of an example of a data structure of a configuration information report 200A;

FIG. 24 is a schematic of an example of a data structure of a approval policy; and FIG. 25 is a schematic of an example of a data structure of an operation log of the ISP.

DESCRIPTION OF EMBODIMENTS

Preferred embodiments of the present invention will be explained with reference to accompanying drawings.

The embodiments are not intended to limit the scope of the present invention in any way.

[a] First Embodiment

Figure 1A:
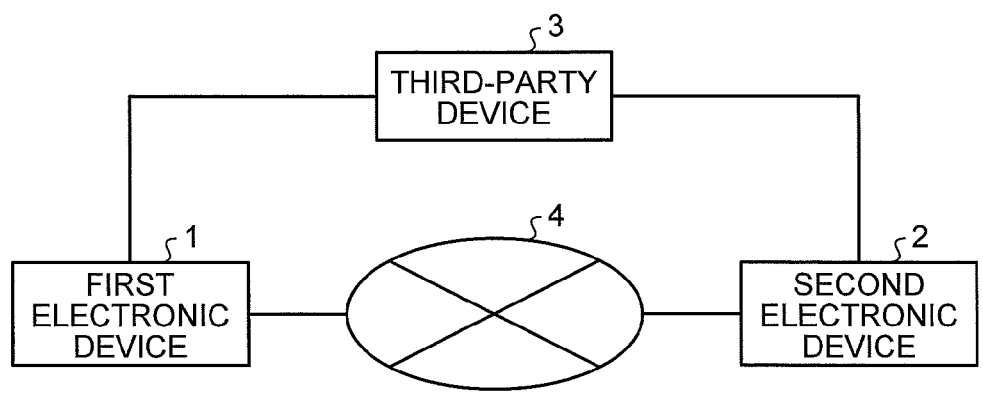
FIG. 1A is a first schematic illustrating a system configuration according to a first embodiment of the present invention.
Figure 1B:
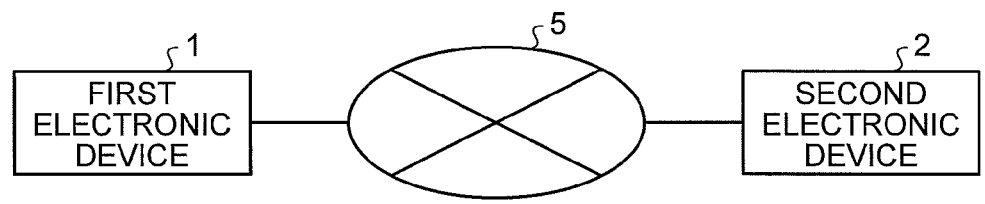
FIG. 1B is a second schematic illustrating the system configuration according to the first embodiment.

FIGS. 1A and 1B are schematics of a configuration of a system according to a first embodiment of the present invention. As illustrated in FIGS. 1A and 1B, this system includes a first electronic device 1, a second electronic device 2, and a third-party device 3.

As illustrated in FIG. 1A, the first electronic device 1 transmits first configuration information of the first electronic device 1 collected by a tamper-resistant chip mounted on the first electronic device 1 and approved by the third-party device 3 to the second electronic device 2 over a short-distance network 4. The first electronic device 1 and the third-party device 3 are connected to a network, for example.

The second electronic device 2 transmits second configuration information of the second electronic device 2 collected by a tamper-resistant chip mounted on the second electronic device 2 and approved by the third-party device 3 to the first electronic device 1 over the short-distance network 4. The second electronic device 2 and the third-party device 3 are connected to a network, for example.

As illustrated in FIG. 1A, the first electronic device 1 transmits the first configuration information of the first electronic device 1 and the second configuration information of the second electronic device to the second electronic device 2 over a network 5.

The second electronic device 2 controls connection between the first electronic device 1 and the second electronic device 2 over the network 5 based on the first configuration information and the second configuration information received from the first electronic device.

Advantageous effects achieved by the system according to the first embodiment will now be explained. The first electronic device 1 acquires the second configuration information approved by the third-party device 3 from the second electronic device 2 over the short-distance network 4, and retains the first configuration information and the second configuration information approved by the third-party device 3. The second electronic device 2 acquires the first configuration information approved by the third-party device 3 from the first electronic device 1 over the short-distance network 4, and retains the first configuration information and the second configuration information approved by the third-party device 3. The second electronic device 2 then controls connection between the first electronic device 1 and the second electronic device 2 over the network 5 using the first configuration information and the second configuration information that can only be known to these electronic devices to be connected having exchanged such information over the short-distance network 4. Therefore, the system according to the first embodiment allows connection to be established to an appropriate destination when connection is to be established between devices over a network.

[B] Second Embodiment

An example of a technology of the Trusted Computing Group (TCG) used in a second embodiment of the present invention will now be explained. Terminals and devices connected to the Internet are constantly exposed to security threats, and the structures of software implemented on a platform could be modified unexpectedly by a virus and spyware, as well as by other malicious scripts, unauthorized accesses, and the like. To protect against such risks, the TCG allows a secure computing environment to be established by ensuring reliability of a platform. A platform herein means hardware, an operating system (OS), applications, and the like.

Conventional security countermeasures that are dependent only on software provide only limited protection against threats of software tampering, for example. Therefore, according to a TCG specification, a trusted platform module (TPM) chip is embedded in a platform to achieve a situation making tampering difficult using the TPM chip as the source of trust, to enable tampering to be reliably detected in case any occurs, and to enable an appropriate remedy to be applied so that a reliable computing environment can be established. Furthermore, by using a TPM chip, a hardware-based protection of data/certification and secure encryption environment can be realized.

A TPM chip will now be explained. A TPM chip is a tamper resistant hardware chip that is bound to an electronic device. A TPM chip is physically bound to a main component of the electronic device so that the chip is not removed from the electronic device. The main component of an electronic device corresponds to a mother board, for example. Because TPM chips are designed to have limited functional implementations, memory areas, and processor powers, the TPM chips can be manufactured at a low cost, and can be used in various types of electronic devices and platforms.

For example, functions of a TPM include functions for generating and storing a Rivest Shamir Adleman (RSA) private key, and functions for providing a signature, encryption, and decryption using the RSA private key. According to the RSA, a pair of a private key and a public key is generated. Functions of the TPM also include a function for performing a hashing operation of the Secure Hash Algorithm 1 (SHA-1), and functions for collecting and maintaining environmental information of the electronic device. At each sequential step of a booting process of a Basic Input/Output System (BIOS), an OS loader, an OS kernel, or the like in a phase of starting the electronic device to which the TPM is bound, the TPM measures a particular part of each of these software codes following a predetermined scheme, hashes the software code thus measured, and registers the result in a register internal to the TPM. The TPM also collects the hardware information of the electronic device to which the TPM is bound, hashes code information associated with the hardware following a predetermined scheme, and registers the result to the register internal to the TPM. In the explanation below, the software codes and the hardware information are collectively referred to as configuration information, as appropriate. When the TPM transmits the configuration information in response to an external request, the TPM appends an electronic signature that is based on a key maintained internal to the TPM to the information to be transmitted, before transmitting the information. In the explanation below, the term "configuration information" means information representing a combination of the configuration information and the electronic signature.

The TCG specifies a software stack and software interfaces for allowing upper layer applications or libraries to use the TPM chip that is a hardware device. The software stack is called TCG Software Stack (TSS), and includes software modules storing therein the functions of the TPM chip with limited resources. An application running on the electronic device can access the functions of the TPM chip using an interface provided by the TSS.

A configuration of the system according to the second embodiment will now be explained. In the second embodiment, explained below is an example assuming a situation in which a maintenance person performs a maintenance task on a wireless LAN router or different types of devices connected to the wireless LAN router using a mobile terminal.

To begin with, the maintenance person goes to the location where the device to be maintained is installed, and visits an administrator of the device. The administrator coming face to face with the maintenance person checks if the maintenance person is a trustworthy person. As a result of checking face to face with the person, if the maintenance person is a trustworthy person, the administrator gives permission to connect the mobile terminal to the wireless LAN router. When the permission for connecting the mobile terminal to the wireless LAN router is granted, the mobile terminal and the wireless LAN router mutually perform connection settings in a secure environment using a short-distance network. Examples of the short-distance network includes wireless communication such as a wireless LAN, infrared communication, and Bluetooth (registered trademark), wired communication such as a wired LAN and a universal serial bus (USB) cable, or may be entered via a bar code, a Quick Response (QR) code, or manually.

After the connection configuration setup is completed, the maintenance person establishes a secure connection between the mobile terminal to the wireless LAN router over a long-distance network such as the Internet and performs the maintenance task.

Figure 2:
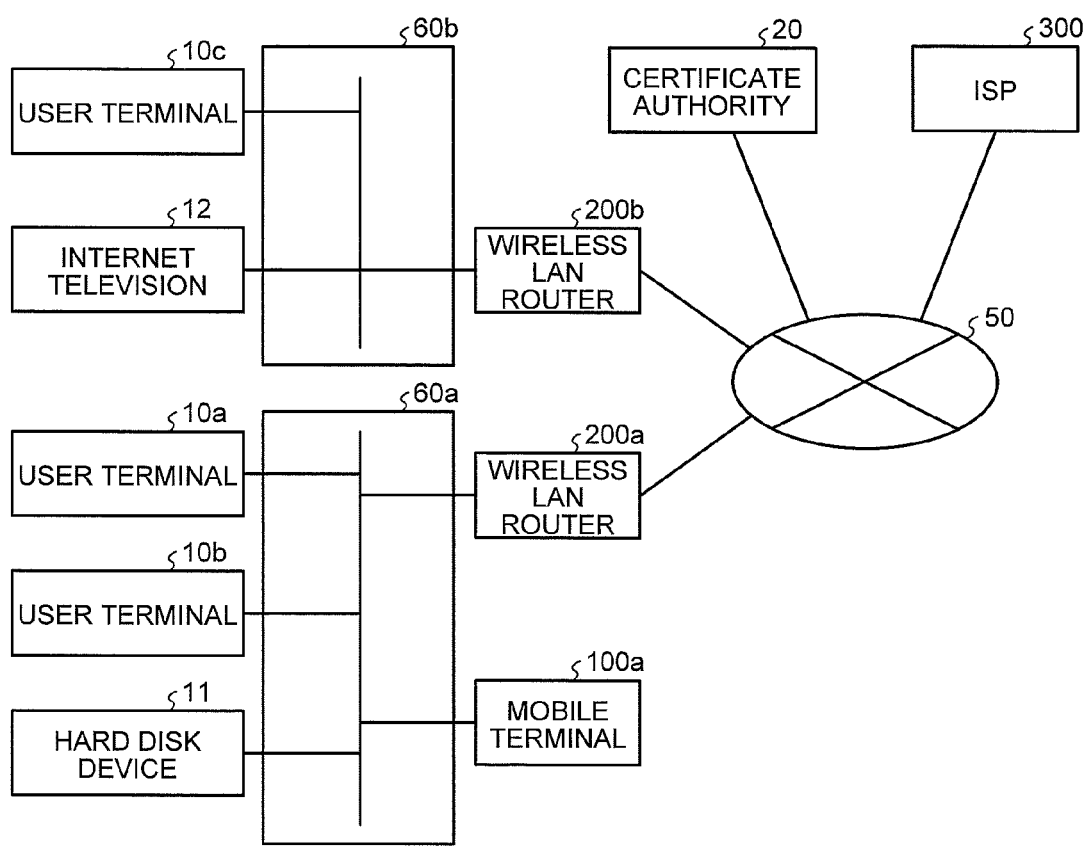
FIG. 2 illustrates an example of a system used when connection settings of electronic devices are mutually performed over a short-distance network.
Figure 3:
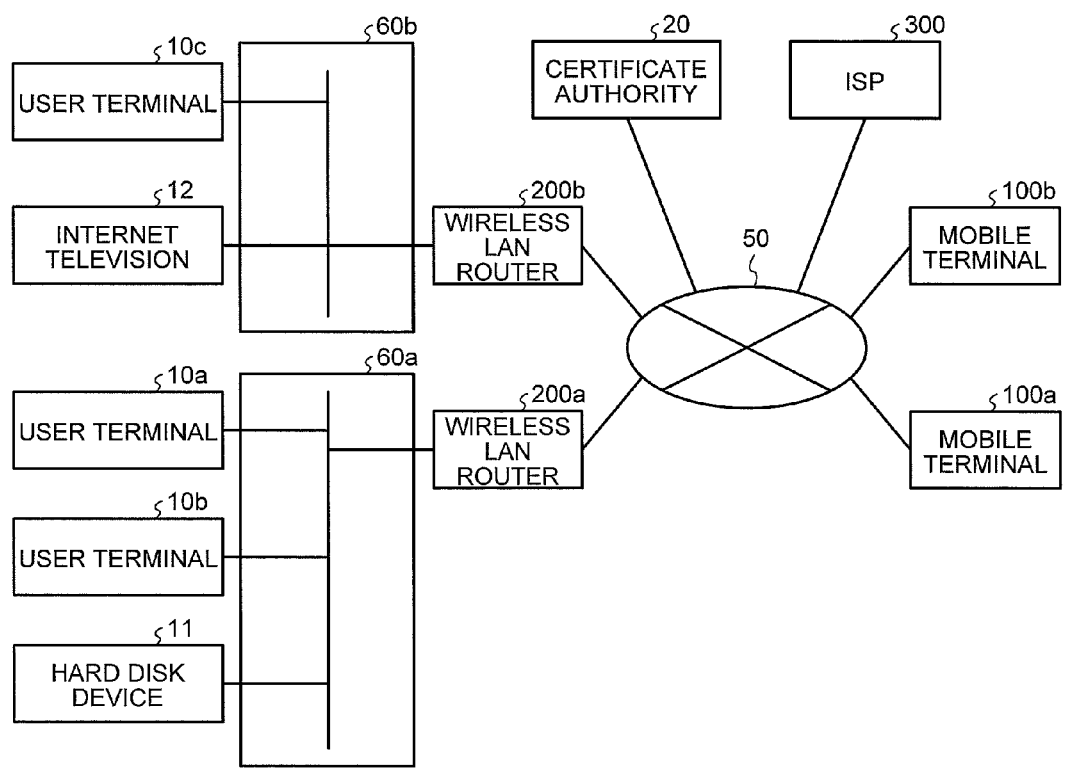
FIG. 3 illustrates an example of a system used when a secure connection is established between the electronic devices over a long-distance network.

FIG. 2 illustrates an example of a system used when connection settings of electronic devices are mutually performed over a short-distance network. The connection settings illustrated in FIG. 2 is performed only once at the beginning. FIG. 3 illustrates an example of a system used when a secure connection is established between the electronic devices over a long-distance network.

As illustrated in FIG. 2, user terminals 10a and 10b, and a hard disk device 11, and a mobile terminal 100a are interconnected via a wireless LAN router 200a over a wireless LAN 60a. For example, the administrator of the wireless LAN router 200a checks the maintenance person with a mobile terminal 100. If the maintenance person is a trustworthy person, the administrator gives permission to connect the mobile terminal 100 to the wireless LAN 60a.

A user terminal 10c and an Internet television are interconnected via a wireless LAN router 200b over a wireless LAN 60b. A certificate authority 20, the wireless LAN routers 200a and 200b, and an Internet services provider (ISP) 300 are interconnected over a network 50.

As illustrated in FIG. 3, the user terminals 10a and 10b, and the hard disk device 11 are interconnected via the wireless LAN router 200a over the wireless LAN 60a. The user terminal 10c and the Internet television are interconnected via the wireless LAN router 200b over the wireless LAN 60b. The certificate authority 20, the mobile terminal 100a and a mobile terminal 100b, the wireless LAN routers 200a and 200b, and the ISP 300 are interconnected over the network 50.

In FIGS. 2 and 3, the user terminals 10a, 10b, and 10c are terminal devices such as personal computers (PCs) used by a user. The hard disk device 11 is an external storage device used by the user terminals 10a, 10b, and the like. A Internet television 12 is a television allowing video programs to be watched using a service provided on the Internet over an Internet connection.

The certificate authority 20 is a device that issues a digital certificate of a public key used by the mobile terminals 100a and 100b, the wireless LAN routers 200a and 200b, and the ISP 300. In the second embodiment, secure data communication is established between the devices using the mechanism of the public-key infrastructure (PKI). For example, the certificate authority 20 maintains the public keys of the mobile terminals 100a and 100b, the public keys of the wireless LAN routers 200a and 200b, and the public key of the ISP 300. The mobile terminals 100a and 100b, the wireless LAN routers 200a and 200b, and the ISP 300 acquire these public keys from the certificate authority 20.

The mobile terminals 100a and 100b are terminal devices used by the maintenance person in performing a maintenance task, for example. In the explanation below, the mobile terminals 100a and 100b are collectively referred to as a mobile terminal 100, as appropriate. A TPM chip is mounted on the mobile terminal 100.

The wireless LAN routers 200a and 200b are devices that relay data communication between each of the devices connected to the wireless LAN and the network 50. In the explanation below, the wireless LAN routers 200a and 200b are collectively referred to as a wireless LAN router 200, as appropriate. A TPM chip is mounted on the wireless LAN router 200.

The ISP 300 acquires the configuration information of the mobile terminal 100 from the TPM chip on the mobile terminal 100, and validates the electronic signature included in the configuration information. After confirming that the configuration information is not tampered, the ISP 300 analyzes the configuration information and gives an approval to the mobile terminal 100. The ISP 300 also acquires the configuration information of the wireless LAN router 200 from the TPM chip on the wireless LAN router 200, and validates the electronic signature included in the configuration information. After confirming that the configuration information is not tampered, the ISP 300 analyzes the configuration information and gives an approval to the wireless LAN router.

Figure 4:
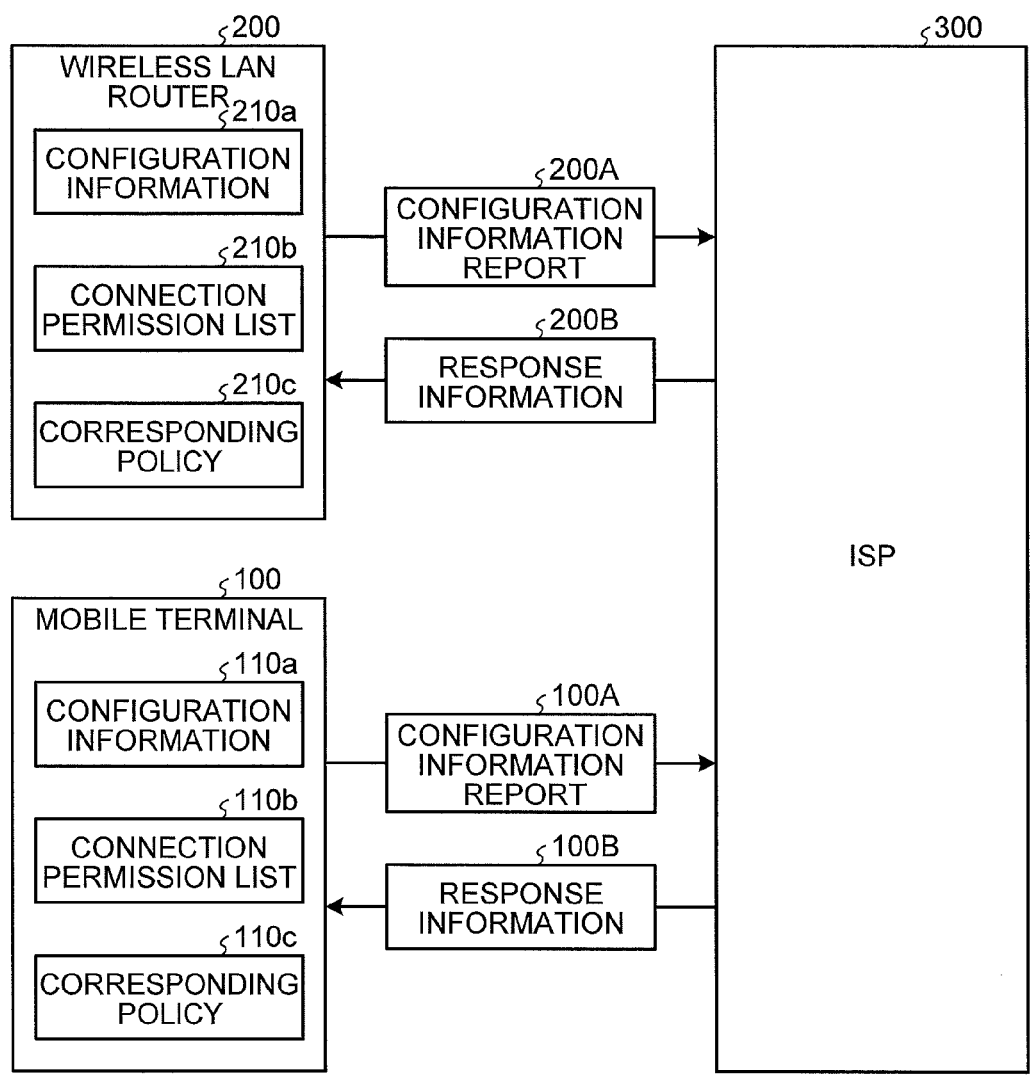
FIG. 4 is a schematic for complementing an explanation of data communication between a mobile terminal and an ISP, and data communication between a wireless LAN router and the ISP.

Explained now is a process performed when connection settings are performed by the mobile terminal 100 and the wireless LAN router 200 in the system configuration illustrated in FIG. 2. As a pre-process, data communication is performed between the mobile terminal 100 and the ISP 300, and between the wireless LAN router 200 and the ISP 300. FIG. 4 is a schematic for complementing the explanation of the data communication between the mobile terminal and the ISP, and the data communication between the wireless LAN router and the ISP.

As illustrated in FIG. 4, the mobile terminal 100 has configuration information 110*a*, a connection permission list 110*b*, and a corresponding policy 110*c*. The mobile terminal 100 transmits a configuration information report 100A to the ISP 300. The ISP 300 transmits response information 100B to the mobile terminal 100. The wireless LAN router 200 has configuration information 210*a*, a connection permission list 210*b*, and a corresponding policy 210*c*. The wireless LAN router 200 transmits a configuration information report 200A to the ISP 300. The ISP 300 transmits response information 200B to the wireless LAN router 200. Each piece of information illustrated in FIG. 4 will be explained later.

Figure 5:
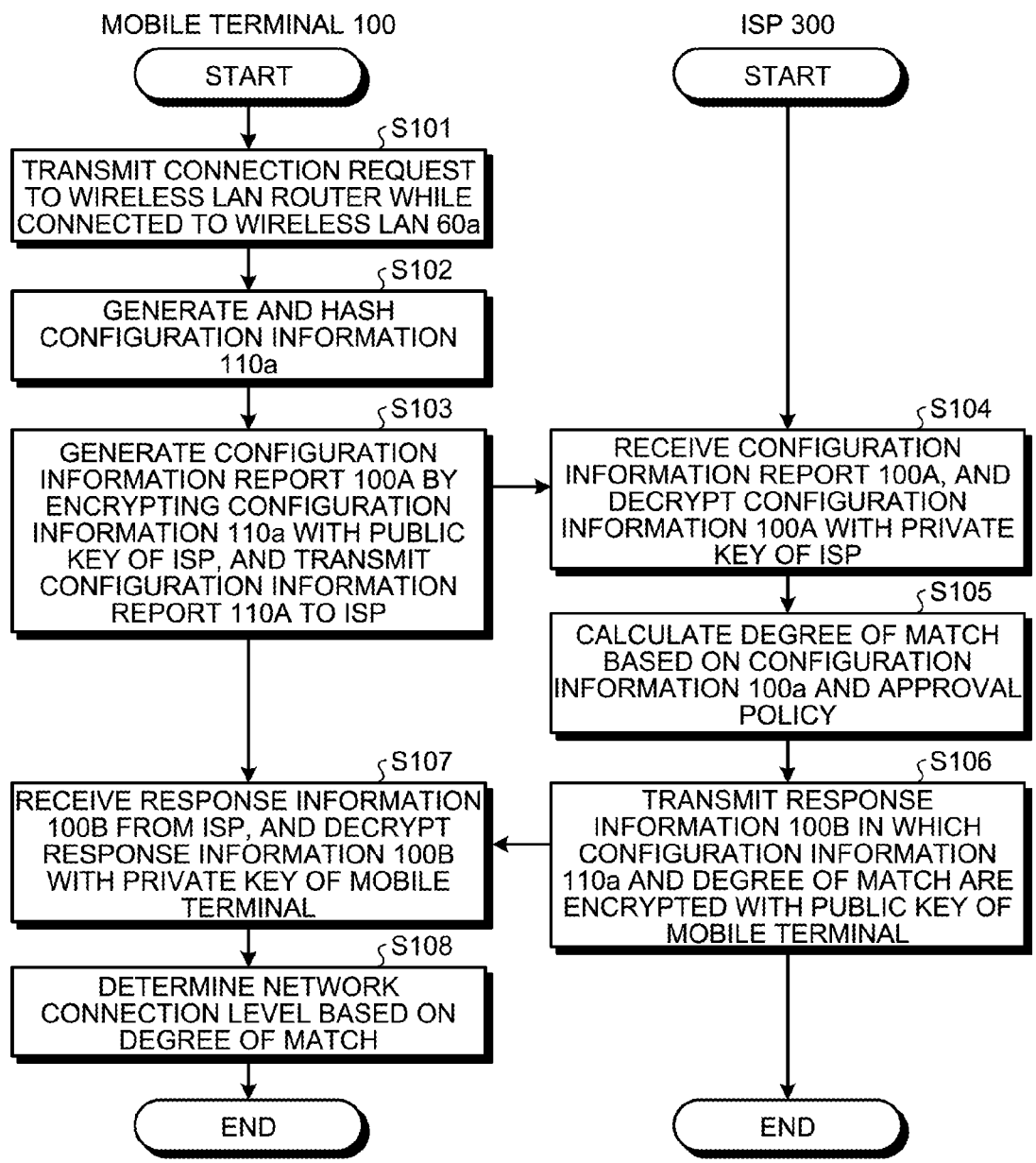
FIG. 5 is a flowchart illustrating a process performed by the mobile terminal and the ISP when connection settings are performed.

FIG. 5 is a flowchart illustrating a process performed by the mobile terminal and the ISP when the connection settings are performed. As illustrated in FIG. 5, the mobile terminal 100 transmits a connection request to the wireless LAN router 200 while the mobile terminal 100 is connected to the wireless LAN 60*a* (Step S101).

The mobile terminal 100 generates and hashes the configuration information 110*a* of the mobile terminal 100 (Step S102). At this time, the mobile terminal 100 may generate an electronic signature using a key retained on the TPM on the mobile terminal 100, and append the electronic signature to the hash. The mobile terminal 100 generates a configuration information report 100A by encrypting the hashed configuration information 110*a* using the public key of the ISP 300 and transmits the configuration information report 100A to the ISP 300 (Step S103).

The ISP 300 receives the configuration information report 100A and decrypts the configuration information report 100A using a private key of the ISP 300 (Step S104). At this time, the ISP 300 may validate that the hash is not tampered, by acquiring the public key that is paired with the signature key retained on the TPM of the mobile terminal 100, and validating the electronic signature. The ISP 300 calculates a degree of match based on the configuration information 110*a* and a approval policy (Step S105). The approval policy herein means a policy for giving an approval to an electronic device based on the configuration information. An electronic device having a higher degree of match is determined to be more trustworthy than an electronic device having a lower degree of match. The approval policy will be explained later in detail.

The ISP 300 transmits the response information 100B that is the degree of match with the configuration information 110*a* encrypted with the public key of the mobile terminal 100 (Step S106). The mobile terminal 100 receives the response information 100B from the ISP 300 and decrypts the response information 100B using the private key of the mobile terminal 100 (Step S107). The mobile terminal 100 determines a network connection level based on the degree of match (Step S108). The process of determining the network connection level performed by the mobile terminal 100 will be described later.

Figure 6:
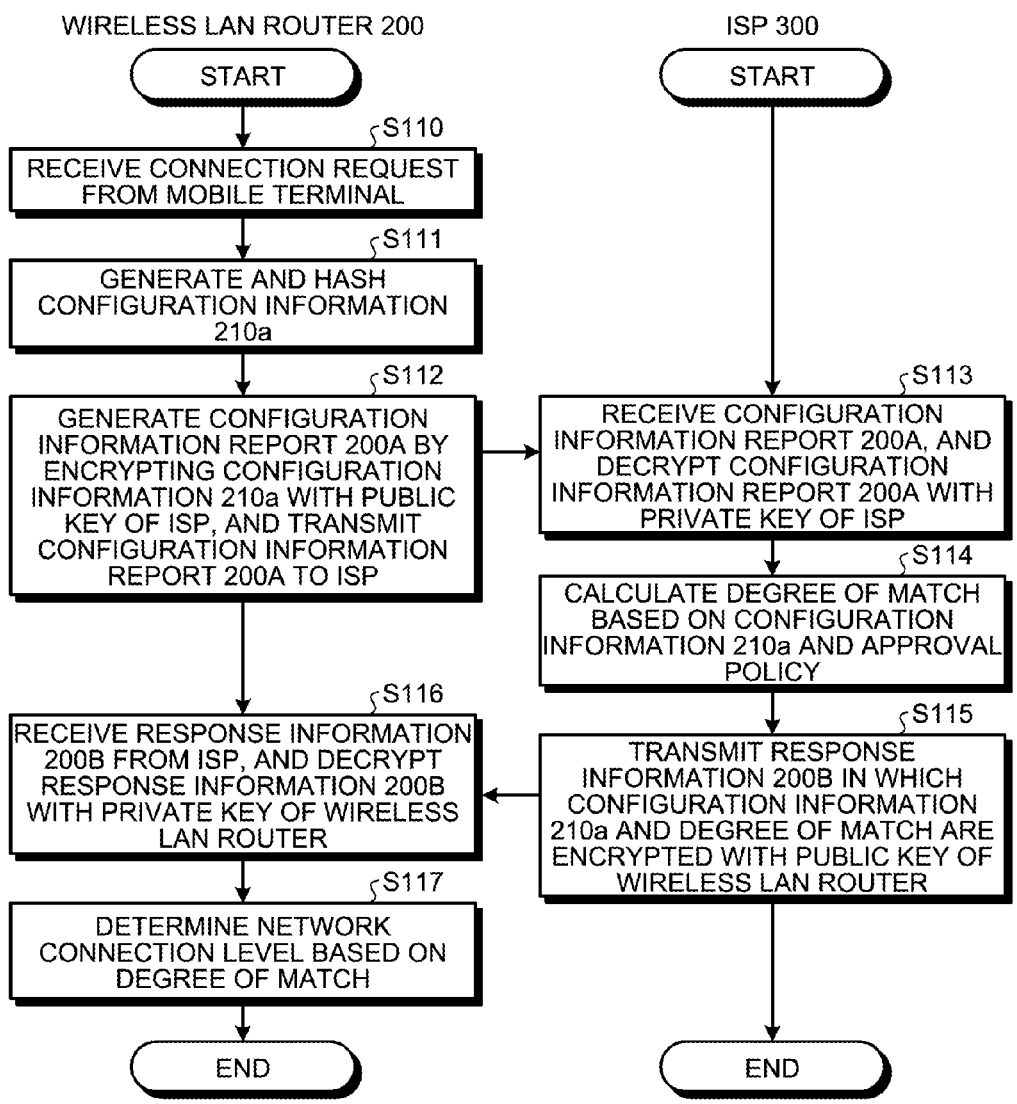
FIG. 6 is a flowchart illustrating a process performed by the wireless LAN router and the ISP when the connection settings are performed.

FIG. 6 is a flowchart illustrating a process performed by the wireless LAN router and the ISP when the connection settings are performed. As illustrated in FIG. 6, the wireless LAN router 200 receives the connection request from the mobile terminal 100 (Step S110).

The wireless LAN router 200 generates and hashes configuration information 210*a* of the wireless LAN router 200 (Step S111). The wireless LAN router 200 generates the configuration information report 200A by encrypting the hashed configuration information 210*a* using the public key of the ISP 300 and transmits the configuration information report 200A to the ISP 300 (Step S112).

The ISP 300 receives the configuration information report 200A and decrypts the configuration information report 200A using the private key of the ISP 300 (Step S113). The ISP 300 calculates a degree of match based on the configuration information 210*a* and the approval policy (Step S114).

The ISP 300 transmits the response information 200B that is the degree of match with the configuration information 210*a* encrypted with the public key of the wireless LAN router 200 (Step S115). The wireless LAN router 200 receives the response information 200B from the ISP 300 and decrypts the response information 200B using the private key of the wireless LAN router 200 (Step S116). The wireless LAN router 200 determines a network connection level based on the degree of match (Step S117). The process of determining the network connection level performed by the wireless LAN router 200 will be described later.

After performing the process illustrated in FIG. 5, the mobile terminal 100 determines if the network connection level is permitted to be executed based on the corresponding policy 110*c*. The corresponding policy 110*c* is a policy that indicates network connection levels permitted to the mobile terminal 100.

After executing the process illustrated in FIG. 6, the wireless LAN router 200 determines if the network connection level is permitted to be executed based on the corresponding policy 210*c*. The corresponding policy 210*c* is a policy that indicates network connection levels permitted to the wireless LAN router 200.

Figure 7:
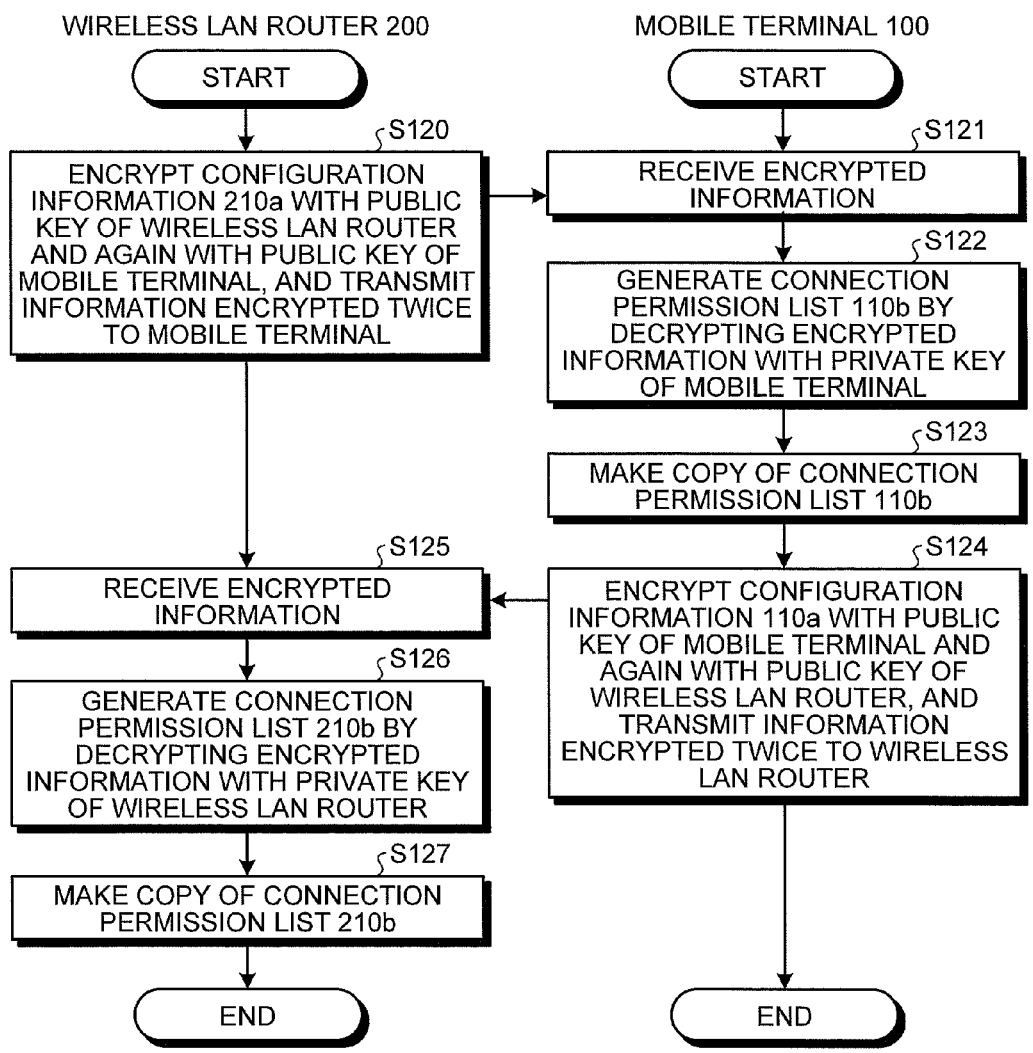
FIG. 7 is a flowchart illustrating a connection setting process performed by the mobile terminal and the wireless LAN router.

If the network connection level of the mobile terminal 100 is permitted to be executed based on the corresponding policy 110*c*, and the network connection level of the wireless LAN router 200 is permitted to be executed based on the corresponding policy 210*c*, the process illustrated in FIG. 7 is executed. FIG. 7 is a flowchart illustrating a connection setting process performed by the mobile terminal and the wireless LAN router.

As illustrated in FIG. 7, the wireless LAN router 200 encrypts the configuration information 210*a* with the public key of the wireless LAN router 200, encrypts the configuration information 210*a* again with the public key of the mobile terminal 100, and transmits the information encrypted twice to the mobile terminal 100 (Step S120).

The mobile terminal 100 receives the encrypted information from the wireless LAN router 200 (Step S121). The mobile terminal 100 then generates the connection permission list 110*b* by decrypting the encrypted information with the private key of the mobile terminal 100 (Step S122), and makes a copy of the connection permission list 110*b* (Step S123).

The mobile terminal 100 then encrypts the configuration information 110*a* with the public key of the mobile terminal 100, encrypts the configuration information 110a again with the public key of the wireless LAN router 200, and transmits the information encrypted twice to the wireless LAN router 200 (Step S124).

The wireless LAN router 200 receives the encrypted information (Step S125). The wireless LAN router 200 generates the connection permission list 210b by decrypting the encrypted information with the private key of the wireless LAN (Step S126), and makes a copy of the connection permission list 210b (Step S127).

The connection settings are completed by performing the processes illustrated in FIGS. 5 to 7, and the mobile terminal 100 comes to store therein the configuration information 110a and the connection permission list 110b, and the wireless LAN router 200 comes to store therein the configuration information 210a and the connection permission list 210b.

Figure 8:
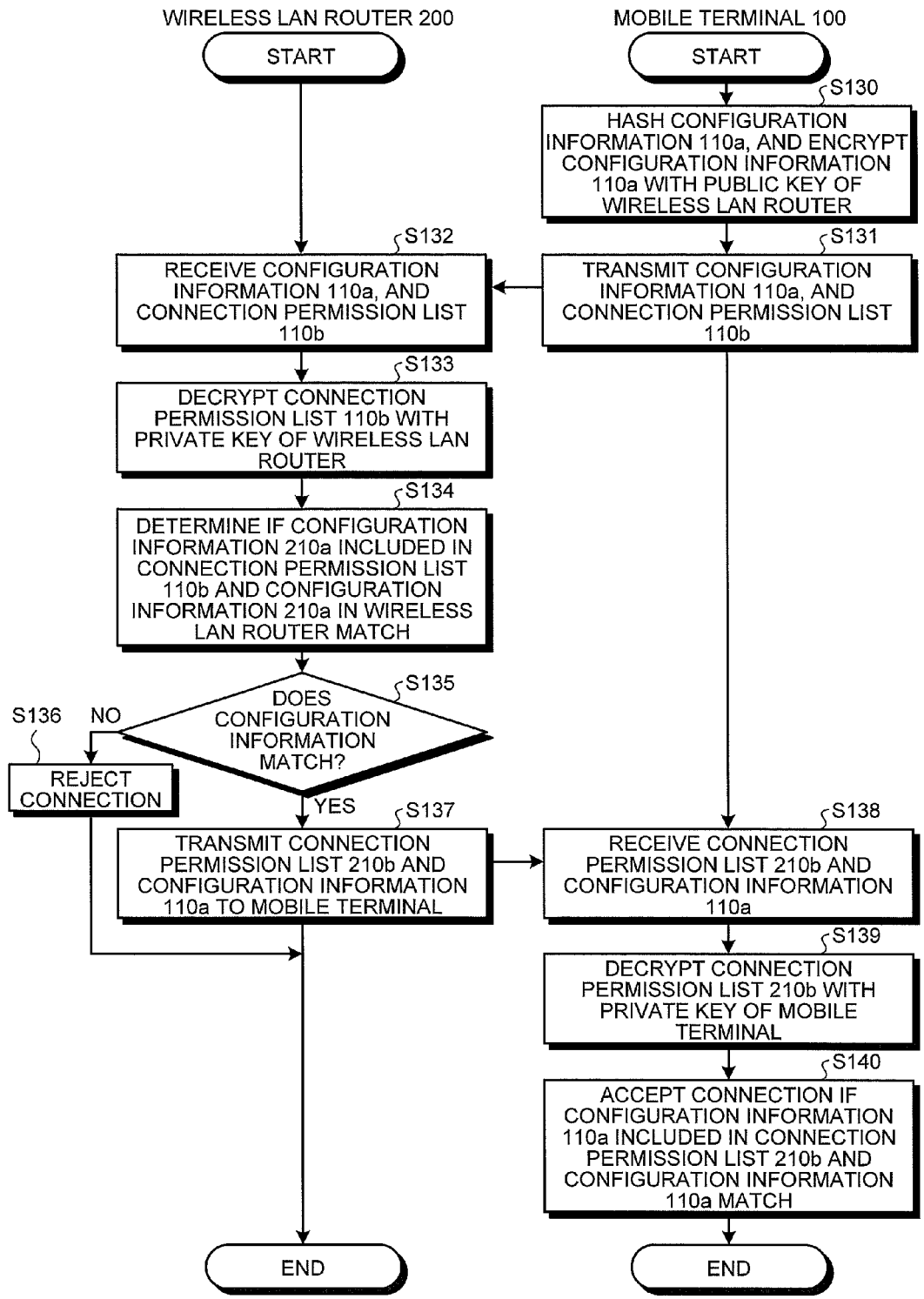
FIG. 8 is a first flowchart of a process of establishing a secure connection between the mobile terminal and the wireless LAN router.
Figure 9:
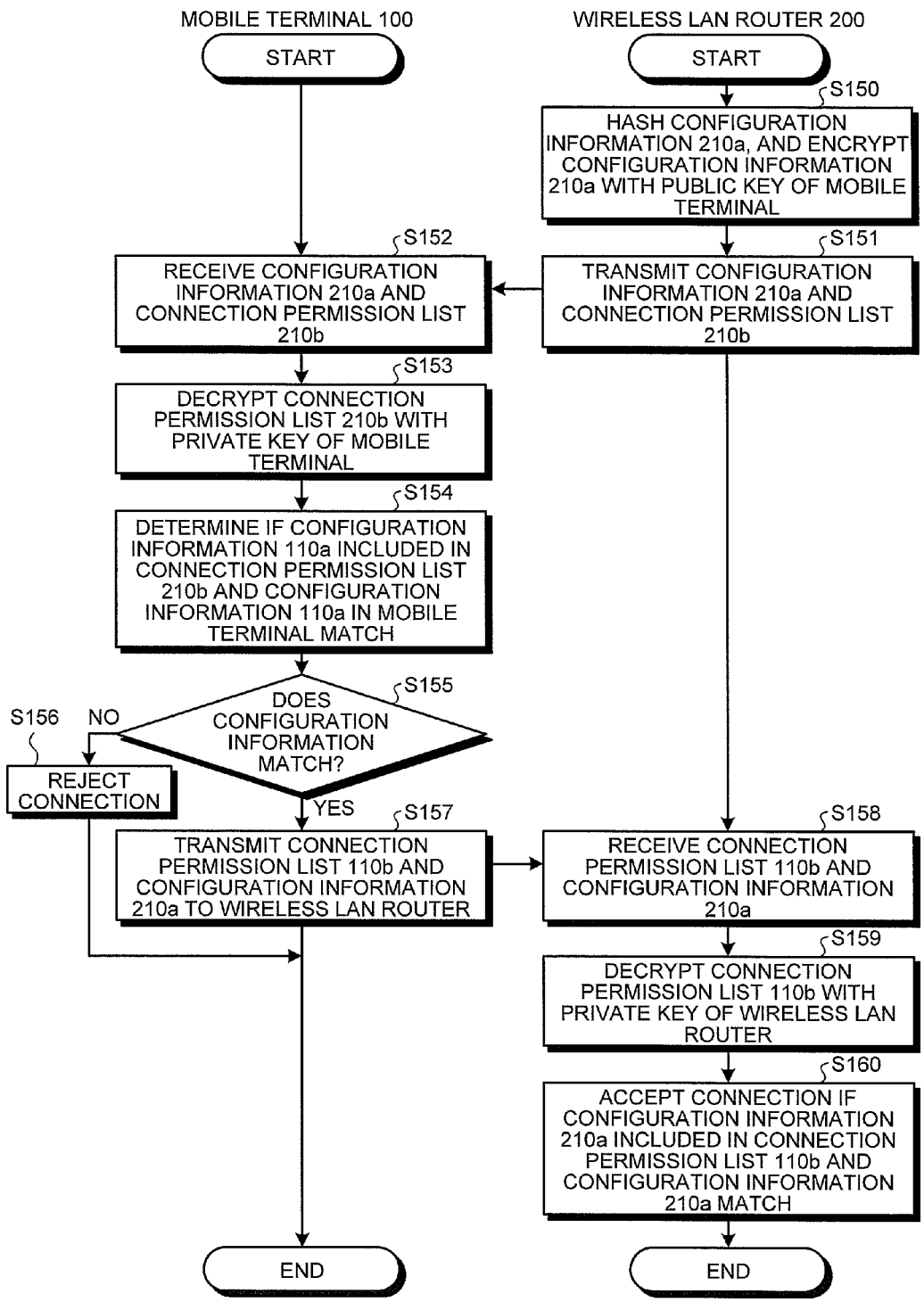
FIG. 9 is a second flowchart of another process of establishing a secure connection between the mobile terminal and the wireless LAN router.

Explained now is an example in which a secure connection is established between the mobile terminal 100 and the wireless LAN router 200 in the system configuration illustrated in FIG. 3. FIGS. 8 and 9 are flowcharts illustrating a process of establishing a secure connection between the mobile terminal and the wireless LAN router. The mobile terminal 100 and the wireless LAN router 200 perform the processes illustrated in FIGS. 8 and 9, respectively.

As illustrated in FIG. 8, the mobile terminal 100 hashes the configuration information 110a and encrypts the configuration information 110a with the public key of the wireless LAN router 200 (Step S130). The mobile terminal 100 transmits the configuration information 110a and the connection permission list 110b to the wireless LAN router 200 (Step S131). The connection permission list 110b is encrypted using the public key of the wireless LAN router 200.

The wireless LAN router 200 receives the configuration information 110a and the connection permission list 110b (Step S132). The wireless LAN router 200 decrypts the connection permission list 110b using the private key of the wireless LAN router (Step S133).

The wireless LAN router 200 determines if the configuration information 210a included in the connection permission list 110b matches the configuration information 210a in the wireless LAN router 200 (Step S134). If the configuration information 210a included in the connection permission list 110b and the configuration information 210a on the wireless LAN router 200 do not match (No at Step S135), the wireless LAN router 200 rejects the connection (Step S136).

If the configuration information 210a included in the connection permission list 110b and the configuration information 210a on the wireless LAN router 200 match (Yes at Step S135), the wireless LAN router 200 transmits the connection permission list 210b and the configuration information 110a to the mobile terminal 100 (Step S137). The connection permission list 210b is encrypted using the public key of the mobile terminal 100.

The mobile terminal 100 receives the connection permission list 210b and the configuration information 110a (Step S138). The mobile terminal 100 decrypts the connection permission list 210b using the private key of the mobile terminal 100 (Step S139). If the configuration information 110a included in the connection permission list 210b and the configuration information 110a match, the mobile terminal 100 accepts the connection (Step S140). The mobile terminal 100 may also notify the wireless LAN router 200 of the result of determination at Step S140.

As illustrated in FIG. 9, the wireless LAN router 200 hashes the configuration information 210a and encrypts the configuration information 210a using the public key of the mobile terminal 100 (Step S150). The wireless LAN router 200 then transmits the configuration information 210a and the connection permission list 210b to the mobile terminal 100 (Step S151). The connection permission list 210b is encrypted using the public key of the mobile terminal 100.

The mobile terminal 100 receives the configuration information 210a and the connection permission list 210b (Step S152). The mobile terminal 100 then decrypts the connection permission list 210b using the private key of the mobile terminal 100 (Step S153).

The mobile terminal 100 determines if the configuration information 110a included in the connection permission list 210b and the configuration information 110a on the mobile terminal 100 match (Step S154). If the configuration information 110a included in the connection permission list 210b and the configuration information 110a on the mobile terminal 100 do not match (No at Step S155), the mobile terminal 100 rejects the connection (Step S156).

If the configuration information 110a included in the connection permission list 210b and the configuration information 110a on the mobile terminal 100 match (Yes at Step S155), the mobile terminal 100 transmits the connection permission list 110b and the configuration information 210a to the wireless LAN router 200 (Step S157). The connection permission list 110b is encrypted using the public key of the wireless LAN router 200.

The wireless LAN router 200 receives the connection permission list 110b and the configuration information 210a (Step S158). The wireless LAN router 200 decrypts the connection permission list 110b using the private key of the wireless LAN router 200 (Step S159). If the configuration information 210a included in the connection permission list 110b and the configuration information 210a match, the wireless LAN router 200 accepts the connection (Step S160). The wireless LAN router 200 may also notify the mobile terminal 100 of the result of determination at Step S160.

As described above, the mobile terminal 100 and the wireless LAN router 200 perform the processes illustrated in FIGS. 8 and 9. When the mobile terminal 100 and the wireless LAN router 200 accept the connection, the mobile terminal 100 and the wireless LAN router 200 are connected.

Figure 10:
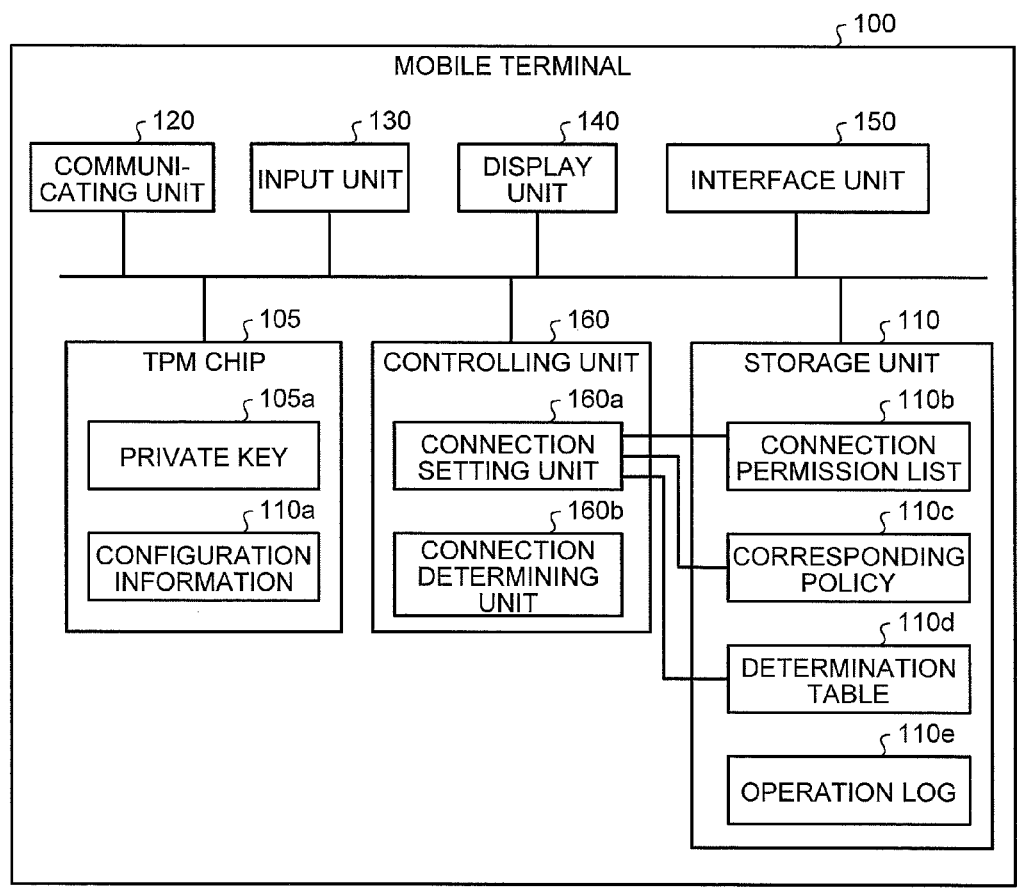
FIG. 10 is a functional block diagram illustrating a configuration of the mobile terminal according to the second embodiment.

A configuration of the mobile terminal 100 according to the second embodiment will now be explained. FIG. 10 is a functional block diagram illustrating the configuration of the mobile terminal according to the second embodiment. As illustrated in FIG. 10, the mobile terminal 100 includes a TPM chip 105, a storage unit 110, a communicating unit 120, an input unit 130, a display unit 140, an interface unit 150, and a controlling unit 160. Because other units included in a IC card 30 are the same as those included in a general mobile terminal, the explanations thereof are omitted herein.

The TPM chip 105 collects the configuration information of the mobile terminal 100 when the mobile terminal 100 is started, for example. The TPM chip 105 then hashes the configuration information thus collected and stores therein the configuration information as the configuration information 110a. The TPM chip 105 also stores therein a private key 105a. The private key 105a is the private key of the mobile terminal 100.

FIG. 11 is a schematic of an example of a data structure of the configuration information stored in the TPM chip on the mobile terminal. As illustrated in FIG. 11, the configuration information 110a includes Entry Number and Description. For example, in the Description with the Entry Number "1", the configuration information corresponding to the boot block portion of the mobile terminal 100 is stored in a hash format. In the Description with the Entry Number "2", the configuration information corresponding to the BIOS portion of the mobile terminal 100 is stored in a hash format. In the Description with the Entry Number "3", the configuration information corresponding to the device configuration portion of the mobile terminal 100 is stored in a hash format.

For example, the portion corresponding to the device configuration corresponds to any one of a physical TPM chip, the version of a physical TPM, a physical OS, a virtual OS, a guest OS, a virtualized TCG chip, the version of a virtualized TPM, mandated software, prohibited software, and permitted software. The portion corresponding to the device configuration may correspond to any one of the model number of the device, the serial number of the device, the model number of a physical OS, the serial number of a physical OS, the version of a physical OS, the model number of a virtual OS, the serial number of a virtual OS, a virtual OS, the version of a virtual OS. The portion corresponding to the device configuration may correspond to any one of the model number of a guest OS, the serial number of a guest OS, the version of a guest OS, the model number of software, the serial number of software, and a software version. The portion corresponding to the device configuration corresponds to any one of a prohibited protocol, a permitted protocol, prohibited operation, and a permitted operation.

The communicating unit 120 is a processing unit that performs data communication with other devices over different types of networks. When the mobile terminal 100a is connected to the wireless LAN 60a as illustrated in FIG. 2, the communicating unit 120 exchanges data with the wireless LAN router 200a, the certificate authority 20, and the ISP 300 via the wireless LAN 60a. When the mobile terminal 100a is connected to the network 50 as illustrated in FIG. 3, the communicating unit 120 exchanges data with the wireless LAN router 200a, the certificate authority 20, and the ISP 300 over the network 50. The controlling unit 160, which will be described later, exchanges data with the certificate authority 20, the wireless LAN router 200a, and the ISP 300 via the communicating unit 120.

The input unit 130 is an input device for entering various types of information to the mobile terminal 100. For example, the input unit 130 corresponds to a keyboard, a mouse, and a touch panel. The display unit 140 is a display device that displays various types of information output from the controlling unit 160. For example, the display unit 140 corresponds to a liquid crystal display or a touch panel. The interface unit 150 is an interface to be connected with various types of external devices.

The storage unit 110 is a storage unit storing therein the connection permission list 110b, the corresponding policy 110c, a determination table 110d, and an operation log 110e. For example, the storage unit 110 corresponds to a storage device such as a random access memory (RAM), a read-only memory (ROM), or a semiconductor memory device such as a flash memory.

The connection permission list 110b corresponds to the connection permission list 110b generated at Step S122 in FIG. 7. The connection permission list 110b includes the configuration information 210a of the wireless LAN router 200. The connection permission list 110b corresponds to the connection permission list 110b generated at Step S122 in FIG. 7. The connection permission list 110b includes the configuration information 210a of the wireless LAN router 200.

FIG. 12 is a schematic of an example of a data structure of the connection permission list 110b in the mobile terminal. As illustrated in FIG. 12, the connection permission list 110b includes Year, Month, and Date of Creation, Time of Creation, and Designation Configuration Information. In FIG. 12, the Year, Month, and Date of Creation indicates the year, month, and date in and on which the connection permission list 110b is created. The Time of Creation indicates the time at which the connection permission list 110b is created. The Designation Configuration Information stores therein the configuration information 210a of the wireless LAN router 200a to which the mobile terminal 100 is permitted to connect. The configuration information 210a of the wireless LAN router 200a is hashed.

The corresponding policy 110c is policy information describing processes that the mobile terminal 100 is permitted to perform. FIG. 13 is a schematic of an example of data structure of the corresponding policy for the mobile terminal 100. As illustrated in FIG. 13, the corresponding policy 110c includes Year, Month, and Date of Creation, Time of Creation, Policy, and Permissibility. The Year, Month, and Date of Creation indicates the year, the month, and the date at which the record is created. The Time of Creation indicates the time at which the record is created. The Policy describes details of a process performed on the wireless LAN router 200, for example. The Permissibility indicates if the process described in the Policy is permitted. For example, registered to the first line of the record in FIG. 13 is the information indicating that a process of "referring to a log on the wireless LAN router 200" is "permitted". Registered to the second line of the record in FIG. 13 is the information indicating that a process of "modifying a log on the wireless LAN router 200" is "rejected".

The determination table 110d is a table for determining a network connection level. FIG. 14 is a schematic of an example of a data structure of a determination table for the mobile terminal. As illustrated in FIG. 14, the determination table 110d stores therein a degree of match and a network connection level in an associated manner. In FIG. 14, a degree of match is a value calculated by the ISP 300 based on the approval policy. For example, when the degree of match is "30", a network connection level having a degree of match equal to or less than "30" is permitted by the ISP 300. Examples of a network connection level having a degree of match equal to or less than "30" include "referring to a log on the wireless LAN router 200", "referring to a log on a PC", and "referring to a file on a PC". The corresponding policy 110c defines the extent by which the mobile terminal 100 permits the network connection levels permitted by the ISP 300.

The operation log 110e is information for retaining a log of the mobile terminal 100. FIG. 15 is a schematic of an example of a data structure of an operation log of the mobile terminal. As illustrated in FIG. 15, the operation log 110e retains Year, Month, and Date of Event, Time of Event, Operated Device, Operator, Description of Operation, and Name of Vendor in an associated manner. For example, the Year, Month, and Date of Event indicates the year, month, and date in and on which an operation is performed. The Time of Event indicates the time at which the operation is performed. The Operator indicates the person who made the operation. The Description of Operation describes the operation. The Name of Vendor indicates the vendor to which the operator belongs, for example.

The controlling unit 160 includes a connection setting unit 160a and a connection determining unit 160b. The controlling unit 160 corresponds to an integrated device such as an application specific integrated circuit (ASIC) or a field programmable gate array (FPGA), for example. The controlling unit 160 also corresponds to an electric circuit such as a central processing unit (CPU) or a micro processing unit (MPU), for example.

The connection setting unit 160a connects to the wireless LAN router 200a over the wireless LAN 60a illustrated in FIG. 2 and performs the process illustrated in FIG. 5 with the ISP 300 and performs the processes illustrated in FIG. 7 with the wireless LAN 200 router.

An example of the process performed by the connection setting unit 160a with the ISP 300 will now be explained. The connection setting unit 160a transmits a connection request to and connects to the wireless LAN router 200, and then acquires the configuration information 110a from the TPM chip 105. The connection setting unit 160a generates the configuration information report 100A by encrypting the configuration information 110a using the public key of the ISP 300 and transmits the configuration information report 100A to the ISP 300.

FIG. 16 is a schematic of an example of a data structure of the configuration information report 100A. As illustrated in FIG. 16, the configuration information report 100A includes Year, Month, and Date of Creation, Time of Creation, Device Created, Signature Information, and Configuration Information 1 to Configuration Information N. Among these pieces of information, the Device Created includes identification information or the like of the mobile terminal 100 having generated the configuration information report 100A. The Signature Information includes an electronic signature A generated by the TPM chip 105. The information in the Configuration Information 1 to Configuration Information N corresponds to the configuration information 110a.

After transmitting the configuration information report 100A to the ISP 300, the connection setting unit 160a receives the encrypted response information 100B from the ISP 300. The connection setting unit 160a decrypts the response information 100B using the private key 105a of the TPM chip 105 and takes out the information representing the degree of match from the response information 100B.

The connection setting unit 160a compares the degree of match with the determination table 110d, and determines a network connection level. The connection setting unit 160a determines if the process at the network connection level is a higher-level process than the process permitted by the corresponding policy 110c by comparing the network connection level thus determined with the corresponding policy 110c.

For example, the connection setting unit 160a may determine if the process at the network connection level is a higher-level process than that permitted by the corresponding policy 110c using the degree of match as a reference. For example, in FIG. 14, it is assumed herein that a process with a higher degree of match is a higher-level process. For example, when a network connection level is to "refer to a setting in the wireless LAN router (low security)", and a process permitted by the corresponding policy 110c is to "refer to a log on the wireless LAN router 200", the network connection level, which is to "refer to a setting in wireless LAN router (low security)" has a higher degree of match. In such a case, the connection setting unit 160a determines if the process at the network connection level is a higher-level process than the process permitted by the corresponding policy 110c.

The connection setting unit 160a acquires the result of determining if the network connection level of the wireless LAN router 200 is a process permitted by the corresponding policy 210c of the wireless LAN router 200.

If the process at the network connection level is a higher-level process than the process permitted by the corresponding policy 110c, and the process at the network connection level of the wireless LAN router 200 is a higher-level process than the process permitted by the corresponding policy 210c, the connection setting unit 160a starts executing the processes corresponding to FIG. 7.

The mobile terminal 100 receives the encrypted information from the wireless LAN router 200. The connection setting unit 160a generates the connection permission list 110b by decrypting the encrypted information with the private key 105a of the mobile terminal 100, and registers the connection permission list 110b in the storage unit 110. Because the encrypted information is encrypted twice, even after the information is decrypted with the private key 105a, the information remains encrypted with the public key of the wireless LAN router 200.

If the process at the network connection level is a higher-level process than the process permitted by the corresponding policy 110c, and the process at the network connection level of the wireless LAN router 200 is a higher-level process than the process permitted by the corresponding policy 210c, the connection setting unit 160a transmits the encrypted information to the wireless LAN router 200. Specifically, the connection setting unit 160a generates the encrypted information by encrypting the configuration information 110a with the public key of the mobile terminal 100 and encrypting the configuration information 110a again with the public key of the wireless LAN router 200.

The connection determining unit 160b is a processing unit that connects to the wireless LAN router 200a over the network 50 illustrated in FIG. 3, performs the processes illustrated in FIGS. 8 and 9, and determines if connection is to be established to the wireless LAN router 200a.

A process corresponding to FIG. 8 performed by the connection determining unit 160b will now be explained. The connection determining unit 160b acquires the configuration information 110a from the TPM chip 105 and encrypts the configuration information 110a using the public key of the wireless LAN router 200. The connection determining unit 160b then transmits the encrypted configuration information 110a and the connection permission list 110b to the wireless LAN router 200.

After transmitting the encrypted configuration information 110a and the connection permission list 110b to the wireless LAN router 200, the connection determining unit 160b receives the connection permission list 210b and the configuration information 110a from the wireless LAN router 200. If the connection determining unit 160b does not receive the connection permission list 210b and the configuration information 110a from the wireless LAN router 200, a connection error may be displayed on the display unit 140.

The connection determining unit 160b decrypts the connection permission list 210b using the private key 105a of the mobile terminal 100. When the configuration information 110a included in the connection permission list 210b and the configuration information 110a received from the wireless LAN router 200 match, the connection determining unit 160b accepts the connection. When a connection determining unit 260b, which is described later, in the wireless LAN router 200 accepts the connection as well, connection is established between the mobile terminal 100 and the wireless LAN router 200.

A process corresponding to FIG. 9 performed by the connection determining unit 160b will now be explained. When the configuration information 210a and the connection permission list 210b are received from the wireless LAN router 200, the connection determining unit 160b decrypts the connection permission list 210b using the private key 105a of the mobile terminal 100.

If the configuration information 110a included in the connection permission list 210b and the configuration information 110a on the TPM chip 105 match, the connection determining unit 160b transmits the connection permission list 110b and the configuration information 210a that is received from the wireless LAN router 200 to the wireless LAN router 200.

If the configuration information 110a included in the connection permission list 210b and the configuration information 110a on the TPM chip 105 do not match, the connection determining unit 160b may display a connection error on the display unit 140.

Figure 17:
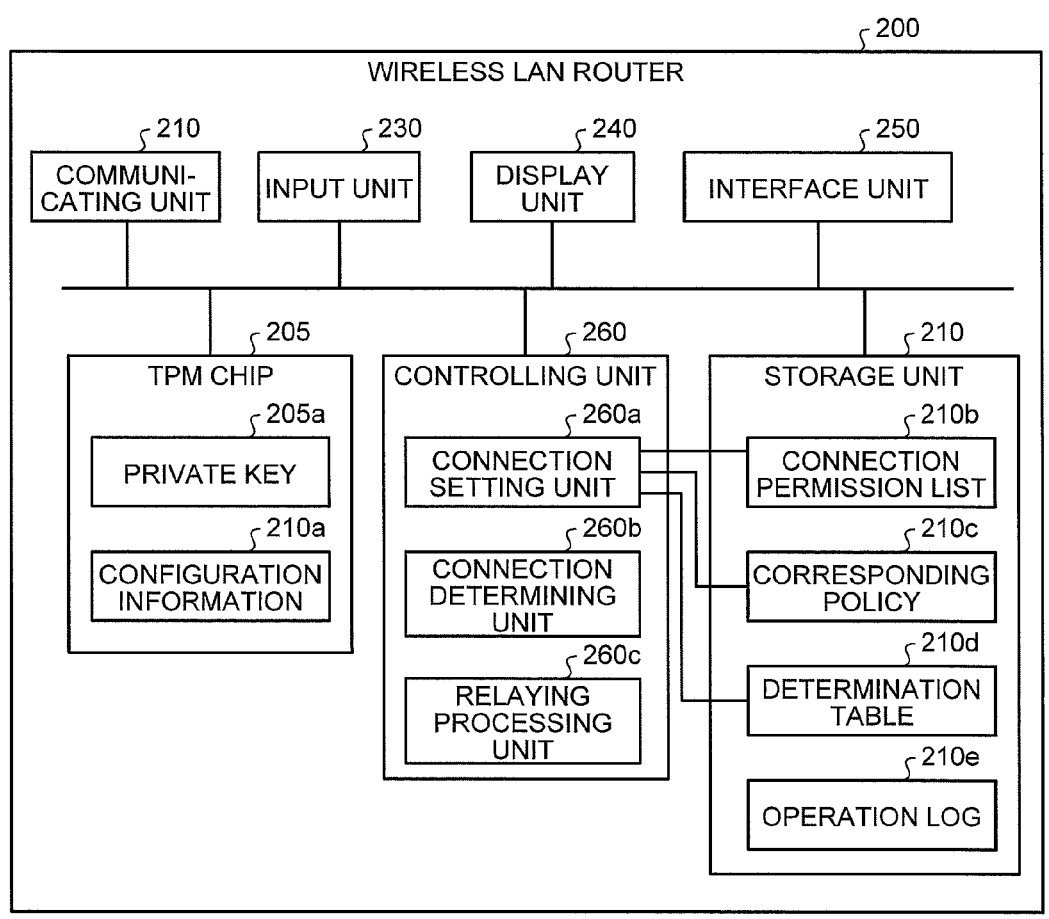
FIG. 17 is a functional block diagram illustrating a configuration of the wireless LAN router according to the second embodiment.

A configuration of the wireless LAN router 200 according to the second embodiment will now be explained. FIG. 17 is a functional block diagram illustrating a configuration of the wireless LAN router according to the second embodiment. As illustrated in FIG. 17, the wireless LAN router 200 includes a TPM chip 205, a storage unit 210, a communicating unit 220, an input unit 230, a display unit 240, an interface unit 250, and a controlling unit 260. Because other units included in the wireless LAN router 200 are the same as those included in a general wireless LAN router, the explanations thereof are omitted herein.

The TPM chip 205 collects the configuration information of the wireless LAN router 200 when the wireless LAN router 200 is started, for example. The TPM chip 205 then hashes the configuration information thus collected and stores therein the configuration information as the configuration information 210a. The TPM chip 205 also stores therein a private key 205a. The private key 205a is the private key of the wireless LAN router 200.

FIG. 18 is a schematic of an example of a data structure of the configuration information stored in the TPM chip on the wireless LAN router. As illustrated in FIG. 18, the configuration information 210a includes Entry Number and Entry. For example, in the Entry with the Entry Number "1", the configuration information corresponding to the boot block portion of the wireless LAN router 200 is stored in a hash format. In the Entry with the Entry Number "2", the configuration information corresponding to the BIOS portion of the wireless LAN router 200 is stored in a hash format. In the Entry with the Entry Number "3", the configuration information corresponding to the device configuration portion of the wireless LAN router 200 is stored in a hash format. The portions corresponding to the device configuration are the same as those described referring to FIG. 11.

The communicating unit 220 is a processing unit that performs data communication with other devices over different types of networks. As illustrated in FIG. 2, when the mobile terminal 100a is connected to the wireless LAN 60a, the communicating unit 220 exchanges data with the mobile terminal 100a over the wireless LAN 60a. As illustrated in FIG. 3, when the mobile terminal 100a is connected to the network 50, the communicating unit 220 exchanges data with the mobile terminal 100a over the network 50. The communicating unit 220 also exchanges data with the certificate authority 20 and the ISP 300 over the network 50. The controlling unit 260, which is described later, exchanges data with the certificate authority 20, the wireless LAN router 200a, and the ISP 300 via the communicating unit 220.

The input unit 230 is an input device for entering various types of information to the wireless LAN router 200. For example, the input unit 230 corresponds to a keyboard, a mouse, and a touch panel. The display unit 240 is a display device that displays various types of information output from the controlling unit 260. For example, the display unit 240 corresponds to a liquid crystal display or a touch panel. The interface unit 250 is an interface to be connected with various types of external devices.

The storage unit 210 is a storage unit storing therein the connection permission list 210b, the corresponding policy 210c, a determination table 210d, and an operation log 210e. For example, the storage unit 210 corresponds to a storage device such as a RAM, a ROM, or a semiconductor memory device such as a flash memory.

The connection permission list 210b corresponds to the connection permission list 210b generated at Step S126 in FIG. 7. The connection permission list 210b includes configuration information 110a of the mobile terminal 100.

FIG. 19 is a schematic of an example of a data structure of the connection permission list 210b in the wireless LAN router. As illustrated in FIG. 19, the connection permission list 210b includes Year, Month, and Date of Creation, Time of Creation, and Designation Configuration Information. In FIG. 19, the Year, Month, and Date of Creation indicates the year, month, and date in and on which the connection permission list 210b is created. The Time of Creation indicates the time at which the connection permission list 210b is created. The Designation Configuration Information stores therein the configuration information 110a of the mobile terminal 100a to which the wireless LAN router is permitted to connect. The configuration information 110a of the mobile terminal 100a is hashed.

The corresponding policy 210c is a policy describing processes that the wireless LAN router 200 is permitted to perform. FIG. 20 is a schematic of an example of a data structure of the corresponding policy for the wireless LAN router. As illustrated in FIG. 20, the corresponding policy 210c includes Year, Month, and Date of Creation, Time of Creation, Policy, and Permissibility. The Year, Month, and Date of Creation indicates the year, month, and date in and on which the record is created. Time of Creation indicates the time at which the record is created. The Policy describes a process performed on the wireless LAN 200, for example. The Permissibility indicates if the process specified in the policy is permitted. For example, registered to the first line of the record in FIG. 13 is the information indicating that the process of "referring to a log on the wireless LAN router 200" is "permitted". Registered in the second line of the record in FIG. 13 is the information indicating that a process of "updating a log on the wireless LAN router 200" is "rejected".

The determination table 210d is a table for determining a network connection level. Because the data structure of the determination table 210d is the same as that of the determination table 110d illustrated in FIG. 14, the explanation thereof is omitted herein.

The operation log 210e is information for retaining a log of the wireless LAN router 200. FIG. 21 is a schematic of an example of a data structure of an operation log of the wireless LAN router. As illustrated in FIG. 21, the operation log 210e retains Year, Month, and Date of Event, Time of Event, Operated Device, Operator, Description of Operation, and Name of Vendor in an associated manner. For example, the Year, Month, and Date of Event indicates the year, month, and date in and on which an operation is performed. The Time of Event indicates the time at which the operation is performed. The Operator indicates the person who made the operation. The Description of Operation describes the operation. The Name of Vendor indicates the vendor to which the operator belongs, for example.

The controlling unit 260 includes a connection setting unit 260a, a connection determining unit 260b, and a relaying processing unit 260c. The controlling unit 260 corresponds to an integrated device such as an ASIC or an FPGA, for example. The controlling unit 260 may correspond to an electric circuit such as a CPU or an MPU, for example.

The connection setting unit 260a is connected to the mobile terminal 100a over the wireless LAN 60a illustrated in FIG. 2, performs the process illustrated in FIG. 6 with the ISP 300, and performs the processes illustrated in FIG. 7 with the wireless LAN router 200.

An example of the process performed by the connection setting unit 260a with the ISP 300 will now be explained. After a connection request is received from the mobile terminal 100 and connection thereto is established, the connection setting unit 260a acquires the configuration information 210a from the TPM chip 205. The connection setting unit 260a generates the configuration information report 200A by encrypting the configuration information 210a using the public key of the ISP 300 and transmits the configuration information report 200A to the ISP 300.

FIG. 22 is a schematic of an example of a data structure of the configuration information report 200A. As illustrated in FIG. 22, the configuration information report 200A includes Year, Month, and Date of Creation, Time of Creation, Device Created, Signature Information, and Configuration Information 1 to Configuration Information N. Among these pieces of information, the Device Created includes the identification information or the like of the wireless LAN router 200 having generated the configuration information report 200A. The Signature Information includes Signature Information B generated by the TPM chip 205. The information in the Configuration Information 1 to Configuration Information N corresponds to the configuration information 210a.

After transmitting the configuration information report 200A to the ISP 300, the connection setting unit 260a receives the encrypted response information from the ISP 300. The connection setting unit 260a decrypts the response information using the private key 205a of the TPM chip 205 and takes out the information of the degree of match from the response information.

The connection setting unit 260a compares the degree of match with the determination table 210d, and determines a network connection level. The connection setting unit 260a determines if the process at the network connection level is a higher-level process than the process permitted by the corresponding policy 210c by comparing the network connection level thus determined with that in the corresponding policy 210c. Because the way in which such a determination is made is the same as that performed by the connection setting unit 260a in the mobile terminal 100, the detailed explanation thereof is omitted herein.

The connection setting unit 160a acquires the result of determining if the network connection level of the mobile terminal 100 is a process permitted by the corresponding policy 110c of the mobile terminal 100.

If the process at the network connection level is a higher-level process than the process permitted by the corresponding policy 210c, and the process at the network connection level of the mobile terminal 100 is a higher-level process than the process permitted by the corresponding policy 110c, the connection setting unit 260a receives the encrypted information from the mobile terminal 100.

The connection setting unit 260a generates the connection permission list 210b by decrypting the encrypted information with the private key 205a of the wireless LAN router 200 and stores the connection permission list 210b in the storage unit 210.

If the process at the network connection level is a higher-level process than the process permitted by the corresponding policy 210c, and the process at the network connection level of the mobile terminal 100 is a higher-level process than the process permitted by the corresponding policy 110c, the connection setting unit 260a also transmits the encrypted information to the wireless LAN router 200. Specifically, the connection setting unit 260a generates the encrypted information by encrypting the configuration information 210a with the public key of the wireless LAN router 200 and encrypting the configuration information 210a again with the public key of the mobile terminal 100.

The connection determining unit 260b is a processing unit that connects to the mobile terminal 100a over the network 50 illustrated in FIG. 3, performs the processes illustrated in FIGS. 8 and 9, and determines if connection is to be established to the mobile terminal 100a.

A process corresponding to FIG. 9 performed by the connection determining unit 260b will now be explained. The connection determining unit 260b acquires the configuration information 210a from the TPM chip 205 and encrypts the configuration information 210a using the public key of the mobile terminal 100. The connection determining unit 260b then transmits the encrypted configuration information 210a and the connection permission list 210b to the mobile terminal 100.

After transmitting the encrypted configuration information 210a and the connection permission list 210b to the mobile terminal 100, the connection determining unit 260b receives a connection permission list 110b and the configuration information 210a from the mobile terminal 100. When the connection permission list 110b and the configuration information 210a is not received from the mobile terminal 100, the connection determining unit 260b may display a connection error on the display unit 240.

The connection determining unit 260b decrypts the connection permission list 110b using the private key 205a of the wireless LAN router 200. When the configuration information 210a included in the connection permission list 110b and the configuration information 210a received from the mobile terminal 100 match, the connection determining unit 260b accepts the connection. When the connection determining unit 160b, which is described later, in the mobile terminal 100 accepts the connection as well, connection is established between the mobile terminal 100 and the wireless LAN router 200.

A process corresponding to FIG. 8 performed by the connection determining unit 260b will now be explained. When the configuration information 110a and the connection permission list 110b are received from the mobile terminal 100, the connection determining unit 260b decrypts the connection permission list 110b using the private key 205a of the wireless LAN router 200.

If the configuration information 210a included in the connection permission list 110b and the configuration information 210a on the TPM chip 205 match, the connection determining unit 260b transmits the connection permission list 210b and the configuration information 110a that is received from the mobile terminal 100 to the mobile terminal 100.

If the configuration information 210a included in the connection permission list 110b and the configuration information 210a on the TPM chip 205 do not match, the connection determining unit 260b may display a connection error on the display unit 240.

The relaying processing unit 260c is a processing unit that intermediates data communication between the user terminal 10a, 10b or the hard disk device 11 and the mobile terminal 100a, for example, after connection is established between the mobile terminal 100 and the wireless LAN router 200.

Figure 23:
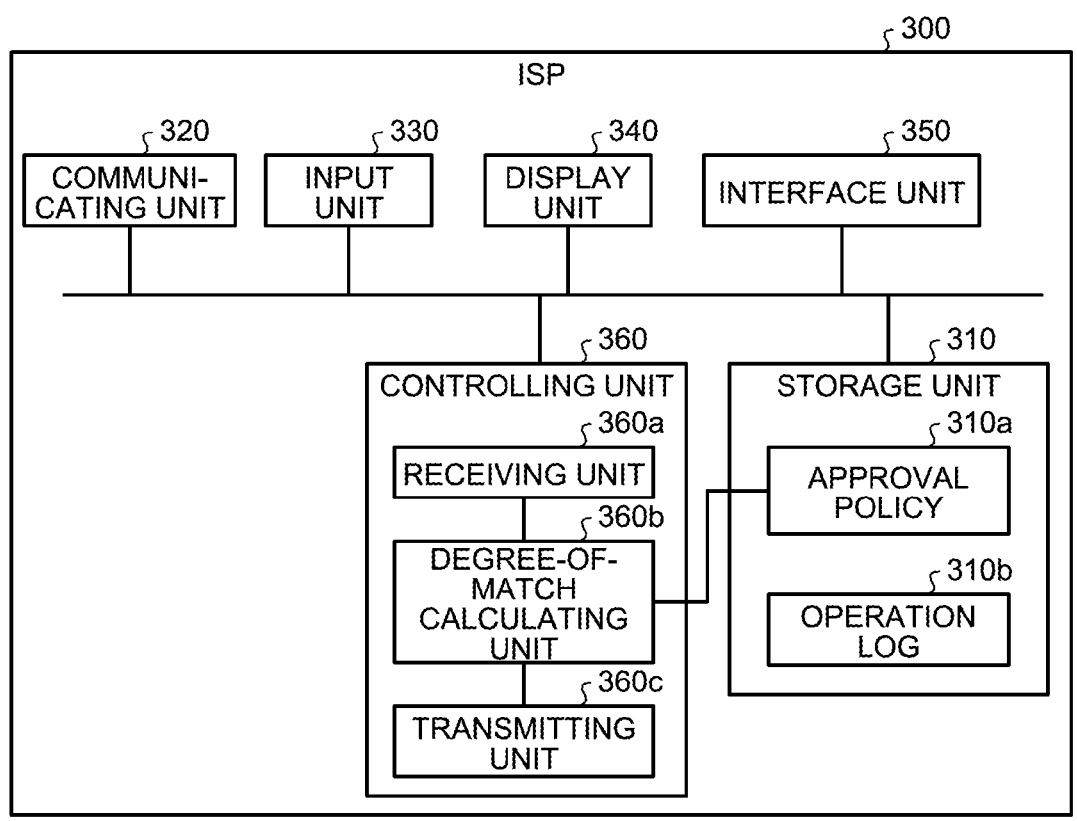
FIG. 23 is a functional block diagram illustrating a configuration of the ISP according to the second embodiment.

A configuration of the ISP 300 according to the second embodiment will now be explained. FIG. 23 is a functional block diagram illustrating a configuration of the ISP according to the second embodiment. As illustrated in FIG. 23, the ISP 300 includes a storage unit 310, a communicating unit 320, an input unit 330, a display unit 340, an interface unit 350, and a controlling unit 360.

The communicating unit 320 is a processing unit that exchanges data with the certificate authority 20, the mobile terminal 100, and the wireless LAN router 200. The controlling unit 360, which is described later, exchanges data with the certificate authority 20, the mobile terminal 100, and the wireless LAN router 200 via the communicating unit 320.

The input unit 330 is an input device for entering various types of information to the ISP 300. For example, the input unit 330 corresponds to a keyboard, a mouse, and a touch panel. The display unit 340 is a display device that displays various types of information output from the controlling unit 360. For example, the display unit 340 corresponds to a liquid crystal display or a touch panel. The interface unit 350 is an interface to be connected with various types of external devices.

The storage unit 310 is a storage device storing therein a approval policy 310a and an operation log 310b. For example, the storage unit 310 corresponds to a storage device such as a RAM, a ROM, or a semiconductor memory device such as a flash memory.

The approval policy 310a is the data used when a degree of match for identifying a network connection level is calculated. FIG. 24 is a schematic of an example of a data structure of the approval policy. As illustrated in FIG. 24, the approval policy 310a retains Configuration Items and Value in an associated manner. A Configuration Item describes a piece of configuration information. Each piece of information in the Configuration Items is a hash. The Values represent values that are added as a degree of match. A configuration item may be added one by one as appropriate. The Values may be updated as appropriate.

The operation log 310b is information for retaining a log of the ISP 300. FIG. 25 is a schematic of an example of a data structure of an operation log of the ISP. As illustrated in FIG. 25, the operation log 310b retains Year, Month, and Date of Event, Time of Event, Operated Device, Operator, Description of Operation, and Name of Vendor in an associated manner. For example, the Year, Month, and Date of Event indicates the year, month, and date in and on which an operation is performed. The Time of Event indicates the time at which the operation is performed. The Operator indicates the person who made the operation. The Description of Operation describes the operation. The Name of Vendor indicates the vendor to which the operator belongs, for example.

The controlling unit 360 includes a receiving unit 360a, a degree-of-match calculating unit 360b, and a transmitting unit 360c. The controlling unit 360 corresponds to an integrated device such as an ASIC or an FPGA, for example. The controlling unit 360 may correspond to an electric circuit such as a CPU or an MPU, for example.

The receiving unit 360a is a processing unit that receives the configuration information report 100A from the mobile terminal 100 and receives the configuration information report 200A from the wireless LAN router 200. The receiving unit 360a outputs the configuration information reports 100A and 200A to the degree-of-match calculating unit 360b.

The degree-of-match calculating unit 360b is a processing unit that calculates a degree of match for the mobile terminal 100 and a degree of match for the wireless LAN router 200, based on the configuration information reports 100A and 200B, respectively, and on the approval policy 310a.

An example of a process in which the degree-of-match calculating unit 360b calculates a degree of match for the mobile terminal 100 will now be explained. The degree-of-match calculating unit 360b decrypts the configuration information report 100A using a private key of the ISP 300, to acquire the configuration information 110a of the mobile terminal 100.

The degree-of-match calculating unit 360b compares the configuration information 110a with the Configuration Items in the approval policy 310a, and identifies matching Configuration Items in the approval policy 310a. The degree-of-match calculating unit 360b then calculates a degree of match for the mobile terminal 100 by acquiring the sum of the Values represented in the matching Configuration Items.

For example, it is assumed that, when the degree-of-match calculating unit 360b compares the configuration information 110a with the Configuration Items in the approval policy 310a, and finds matches with the Configuration Items "boot block a", "BIOS-a", "boot block b", and "OS boot manager a". The value of the "boot block a" is "10". The value of the "BIOS-a" is "10". The value of the "boot block b" is "3". The value of the "boot manager a" is "10". In such a case, the degree-of-match calculating unit 360b acquires "33" as a degree of match for the mobile terminal 100.

The degree-of-match calculating unit 360b generates the response information 100B by encrypting the information of the degree of match with the configuration information 110a using the public key of the mobile terminal. The degree-of-match calculating unit 360b then outputs the response information 100B to the transmitting unit 360c.

An example of a process in which the degree-of-match calculating unit 360b calculates a degree of match for the wireless LAN router 200 will now be explained. The degree-of-match calculating unit 360b decrypts the configuration information report 200A using a private key of the ISP 300, to acquire the configuration information 210a of the wireless LAN router 200.

The degree-of-match calculating unit 360b compares the configuration information 210a with the Configuration Items in the approval policy 310a, and identifies matching Configuration Items in the approval policy 310a. The degree-of-match calculating unit 360b calculates the degree of match for the wireless LAN router 200 by acquiring the sum of the values of the matching Configuration Items. The process of calculating a degree of match is the same as the process of calculating a degree of match for the mobile terminal 100.

The degree-of-match calculating unit 360*b* generates the response information 200B by encrypting the configuration information 210*a* and the information of the degree of match using the public key of the wireless LAN router 200. The degree-of-match calculating unit 360*b* then outputs the response information 200B to the transmitting unit 360*c*.

The transmitting unit 360*c* is a processing unit that transmits the response information 100B and 200B to the mobile terminal 100 and the wireless LAN router 200, respectively. Specifically, when the configuration information report 100A is received from the mobile terminal 100*a*, the ISP 300 transmits the response information 100B to the mobile terminal 100*a*. When the configuration information report 200B is received from the wireless LAN router 200*a*, the ISP 300 transmits the response information 200A to the wireless LAN router 200*a*.

The effects achieved by the system according to the second embodiment will now be explained. Once the ISP 300 approves a piece of configuration information collected by the TPM chip on the mobile terminal 100 and another piece of configuration information collected by the TPM chip on the wireless LAN router 200, these pieces of configuration information are communicated between the mobile terminal 100 and the wireless LAN router 200 over a wireless LAN 60. By performing this process in advance, each of the mobile terminal 100 and the wireless LAN router 200 comes to own a pair of configuration information that are owned only by the appropriate designations. For example, when the wireless LAN router 200 receives a connection request from the mobile terminal 100 over the network 50, the wireless LAN router 200 controls to accept or to reject the connection from the mobile terminal 100 using the pair of pieces of configuration information received from the mobile terminal 100. In the manner described above, the system according to the second embodiment allows connection to be established between appropriate designations, when devices are to be connected over a network 50.

The system according to the second embodiment determines if the configuration information 110*a* of the mobile terminal 100 received over the network 50 and the configuration information 110*a* of the mobile terminal 100 received over the wireless LAN 60 match. Furthermore, the system according to the second embodiment determines if the configuration information 210*a* of the wireless LAN router 200 received over the network 50 and the configuration information 210*a* of the wireless LAN router 200 received over the wireless LAN 60 match. If these pieces of the configuration information 110*a* match and these pieces of the configuration information 210*a* match, the mobile terminal 100 and the wireless LAN router 200 are connected. Therefore, a secure connection can be established with an appropriate destination using configuration information that is not spoofed.

Furthermore, in the system according to the second embodiment, configuration information is exchanged when the network connection level approved by the ISP 300 is larger than the level specified in the corresponding policy. Therefore, processes can be controlled based on a corresponding policy that is specific to the mobile terminal 100 or the wireless LAN router 200.

Although some embodiments of the present invention are explained above, the present invention may be implemented in various different configurations other than those disclosed in the embodiments. Another embodiment of the present invention will now be explained.

For example, in the processes illustrated in FIGS. 8 and 9, the wireless LAN router 200 determines if the configuration information 210*a* included in the connection permission list 110*b* and the configuration information 210*a* on the wireless LAN router 200 match and if these pieces of configuration information do not match, the connection is rejected. However, the present invention is not limited thereto. For example, if these pieces of configuration information do not match, the wireless LAN router 200 may transmit the configuration information 210*a* included in the connection permission list 110*b* to the ISP 300, and ask the ISP 300 to calculate a degree of match. The wireless LAN router 200 may then consider, if the degree of match is equal to or higher than a particular degree of match, that the configuration information 210*a* included in the connection permission list 110*b* and the configuration information 210*a* on the wireless LAN router 200 match.

The wireless LAN router 200 may also determine whether to accept the connection based on a predefined policy when the configuration information 210*a* included in the connection permission list 110*b* and the configuration information 210*a* on the wireless LAN router 200 do not match. For example, wireless LAN router 200 may compare the configuration information 210*a* included in the connection permission list 110*b* with the configuration information 210*a* on the wireless LAN router 200, and determine to accept the connection if a part of these pieces of configuration information match.

Similarly, in the processes illustrated in FIGS. 8 and 9, the mobile terminal 100 determines if the configuration information 110*a* included in the connection permission list 210*b* and the configuration information 110*a* on the mobile terminal 100 match and if these pieces of configuration information do not match, the connection is rejected. However, the present invention is not limited thereto. For example, if these pieces of configuration information do not match, the mobile terminal 100 may transmit the configuration information 110*a* included in the connection permission list 210*b* to the ISP 300, and ask the ISP 300 to calculate a degree of match. The mobile terminal 100 may then consider, if the degree of match is equal to or higher than a particular degree of match, that the configuration information 110*a* included in the connection permission list 210*b* and the configuration information 110*a* on the mobile terminal 100 match.

Furthermore, the mobile terminal 100 may also determine whether to accept the connection based on a predefined policy when the configuration information 110*a* included in the connection permission list 210*b* and the configuration information 110*a* on the mobile terminal 100 do not match. For example, the mobile terminal 100 may compare the configuration information 110*a* included in the connection permission list 210*b* with the configuration information 110*b* on the mobile terminal 100, and determine to accept the connection if a part of these pieces of configuration information match.

Sometimes software updates or the like could be applied to the mobile terminal 100 or the wireless LAN router 200 after the configuration information is exchanged over the wireless LAN 60. In such a case, configuration information included in the connection permission list and the configuration information on the mobile terminal 100 or the wireless LAN router 200 might not match. Therefore, by performing exception handling such as those described above, the mobile terminal 100 and the wireless LAN router 200 are securely connected while accommodating with such changes in the configuration information in a flexible manner.

In explaining the embodiments, the mobile terminal 100 and the wireless LAN router 200 are used as an example of an electronic device establishing connection over the network 50, but an electronic device to which the present invention can be applied is not limited thereto. For example, an electronic device to which the present invention can be applied may be any electronic device connecting to a network. For example, the electronic device may be a server, a printer, a network device, an external storage, a mobile phone, a smartphone, a refrigerator, a washing machine, a television, a stereo system, medical equipment, and machining equipment.

The connection setting unit 160a in the mobile terminal 100 illustrated in FIG. 10 is an example of a receiving unit and a transmitting unit. The connection determining unit 160b is an example of a controlling unit. The connection setting unit 260a illustrated in FIG. 17 is an example of the receiving unit and the transmitting unit. The connection determining unit 260b is an example of the controlling unit.

Explained in the example illustrated in FIG. 2 is a configuration in which a wireless LAN router 200 and the mobile terminal 100 are connected over the wireless LAN 60a. However, the present invention is not limited thereto. For example, the wireless LAN router 200 and the mobile terminal 100 may be connected using wireless communication such as a wireless LAN, infrared communication, and Bluetooth (registered trademark), wired communication such as a wired LAN and a USB cable, or other input methods such as a bar code, a QR code, or a manual input.

The data structures of the connection permission lists 110b and 210b illustrated in FIGS. 20 and 27 are merely an example. For example, the connection permission list 110b, 210b may include Permitted Device, Permitted User, Permitted ISP, Source, Designation, and Permissibility. The Permitted Device represents information of an electronic device permitted to connect with. The Permitted User represents information of a user permitted to connect with. The Permitted ISP represents information of the ISP 300 permitted to connect with. The Source and the Designation represents information of a source electronic device and a designation electronic device to which connection is permitted. The Permissibility represents information if connection is permitted.

According to an embodiment of the present invention, connection can be established to an appropriate designation when connection is to be established between devices over a network.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment(s) of the present invention have been described in detail, it should be understood that the various changes, substitutions, and alterations could be made hereto without departing from the spirit and scope of the invention.

What is claimed is:

1. A network connecting method comprising:
   first collecting at which a tamper-resistant chip mounted on a first electronic device collects first configuration information of the first electronic device, wherein the first configuration information includes software codes of software installed in the first electronic device and hardware information of first hardware installed in the first electronic device;
   first transmitting at which the first electronic device transmits the first configuration information to a second electronic device over a short-distance network, when the first configuration information is approved by a third party device;
   second collecting at which a tamper-resistant chip mounted on the second electronic device collects second configuration information of the second electronic device, wherein the second configuration information includes software codes of software installed in the second electronic device and hardware information of second hardware installed in the second electronic device;
   second transmitting at which the second electronic device transmits the second configuration information to the first electronic device over the short-distance network, when the second configuration information is approved by a third party device;
   third transmitting at which the first electronic device transmits a first combination data to the second electronic device over a network, the first combination data including the first configuration information collected at the first collecting and the second configuration information transmitted at the second transmitting; and
   controlling at which the second electronic device controls connection between the first electronic device and the second electronic device over the network based on the first combination data and a second combination data, the second combination data including the first configuration information data transmitted at the first transmitting and the second configuration information data collected at the second collecting.

2. The network connecting method according to claim 1, wherein at the controlling, the first electronic device and the second electronic device are connected when the first combination data corresponds to the second combination data.

3. The network connecting method according to claim 1, further comprising determining whether the first configuration information received from the first electronic device over the network and the first configuration information received over the short-distance network do not match, wherein
   at the controlling, when the first configuration information received from the first electronic device over the network and the first configuration information received over the short-distance network do not match, the second electronic device controls connection between the first electronic device and the second electronic device over the network based on a predefined policy or on a result of the approval granted by the third-party device.

4. The network connecting method according to claim 1, wherein at the second transmitting, the second electronic device transmits the second configuration information to the first electronic device when a level of the network is equal to or higher than a particular level, the level of the network being determined based on a level of the second configuration information of the second electronic device approved by the third-party device and a predefined policy.

5. An electronic device comprising:
   a memory; and
   a processor coupled to the memory, wherein the processor executes a process comprising:

first receiving first configuration information of other electronic device, after being collected by a tamper-resistant chip mounted on the other electronic device and approved by a third-party device from the other electronic device over a short-distance network, wherein the first configuration information includes software codes of software installed in the other electronic device and hardware information of first hardware installed in the other electronic device;

transmitting second configuration information of the electronic device, after being collected by a tamper-resistant chip mounted on the electronic device and approved by the third-party device to the other electronic device over the short-distance network, wherein the second configuration information includes software codes of software installed in the electronic device and hardware information of second hardware installed in the electronic device;

second receiving a first combination data from the other electronic device over a network, the first combination data including the first configuration information of the other electronic device and the second configuration information transmitted at the transmitting, controlling connection between the other electronic device and the electronic device over the network based on the first combination data and a second combination data, the second combination data including the first configuration information received at the first receiving and the second configuration information collected by the tamper-resistant chip mounted on the electronic device.

* * * * *

UNITED STATES PATENT AND TRADEMARK OFFICE
CERTIFICATE OF CORRECTION

| | | |
|---|---|---|
| PATENT NO. | : 9,660,863 B2 | |
| APPLICATION NO. | : 13/961426 | |
| DATED | : May 23, 2017 | |
| INVENTOR(S) | : Kouji Sakai et al. | |

It is certified that error appears in the above-identified patent and that said Letters Patent is hereby corrected as shown below:

On the Title Page

Item [72] (Inventors), Line 7:
Delete "Sinagawa" and insert -- Shinagawa --, therefore.

In the Claims

Column 25, Line 23:
In Claim 5, delete "transmitting," and insert -- transmitting; and --, therefore.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*